(12) United States Patent
Kato

(10) Patent No.: US 8,621,284 B2
(45) Date of Patent: *Dec. 31, 2013

(54) OPERATIONS MANAGEMENT APPARATUS, OPERATIONS MANAGEMENT SYSTEM, DATA PROCESSING METHOD, AND OPERATIONS MANAGEMENT PROGRAM

(71) Applicant: NEC Corporation, Tokyo (JP)

(72) Inventor: Kiyoshi Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,858

(22) Filed: Dec. 12, 2012

(65) Prior Publication Data

US 2013/0138594 A1 May 30, 2013

Related U.S. Application Data

(63) Continuation of application No. 13/402,066, filed on Feb. 22, 2012, now Pat. No. 8,356,213, which is a continuation of application No. 12/391,445, filed on Feb. 24, 2009, now Pat. No. 8,225,144.

(30) Foreign Application Priority Data

Feb. 25, 2008 (JP) .................................. 2008-043047

(51) Int. Cl.
G06F 11/00 (2006.01)

(52) U.S. Cl.
USPC ............................................ 714/47.1; 714/48

(58) Field of Classification Search
USPC ................... 714/47.1, 47.2, 37, 45, 46, 48
See application file for complete search history.

(56) References Cited

U.S. PATENT DOCUMENTS

| 8,225,144 | B2* | 7/2012 | Kato | 714/47.1 |
| 8,356,213 | B2* | 1/2013 | Kato | 714/47.1 |
| 2007/0016476 | A1* | 1/2007 | Hoffberg et al. | 705/14 |
| 2009/0216624 | A1* | 8/2009 | Kato | 705/10 |
| 2011/0010581 | A1* | 1/2011 | Tanttu et al. | 714/11 |

FOREIGN PATENT DOCUMENTS

| JP | 2002268922 A | 9/2002 |
| JP | 2002342182 A | 11/2002 |
| JP | 2003131907 A | 5/2003 |
| JP | 2005524886 A | 8/2005 |
| JP | 2006024017 A | 1/2006 |
| JP | 2006146668 A | 6/2006 |
| JP | 2007207117 A | 8/2007 |

* cited by examiner

Primary Examiner — Dieu-Minh Le

(57) ABSTRACT

An operations management apparatus which acquires performance information for each of a plurality of performance items from a plurality of controlled units and manages operation of the controlled units includes a correlation model generation unit which derives a correlation function between a first element and a second element of the performance information, generates a correlation model between the first element and the second element based on the correlation function, and obtains the correlation model for each element pair of the performance information, and a model searching unit which searches for the correlation model for each element between an input element and an output element among elements of the performance information in series, and predicts a value of the output element from a value of the input element based on the searched correlation model.

10 Claims, 26 Drawing Sheets

FIG.3

12a PERFORMANCE INFORMATION

| PERFORMANCE ITEM / TIME | SV1.CPU | SV1.MEM | ... | SV2.CPU | ... |
|---|---|---|---|---|---|
| ... | ... | ... | ... | ... | ... |
| 2007/10/05 17:25 | 12 | 80 | ... | 33 | ... |
| 2007/10/05 17:26 | 15 | 79 | ... | 32 | ... |
| 2007/10/05 17:27 | 34 | 51 | ... | 32 | ... |
| 2007/10/05 17:28 | 63 | 51 | ... | 35 | ... |
| 2007/10/05 17:29 | 20 | 81 | ... | 50 | ... |
| 2007/10/05 17:30 | 10 | 78 | ... | 51 | ... |
| 2007/10/05 17:31 | 11 | 79 | ... | 34 | ... |
| ... | ... | ... | ... | ... | ... |

FIG.8

| INPUT | OUTPUT | ... | A | B | ... | W | ... |
|---|---|---|---|---|---|---|---|
| SV1.CPU | SV1.MEM | ... | −0.6 | 100 | ... | 0.88 | ... |
| . | . | . | . | . | . | . | . |

116a CORRELATION MODEL

FIG.9
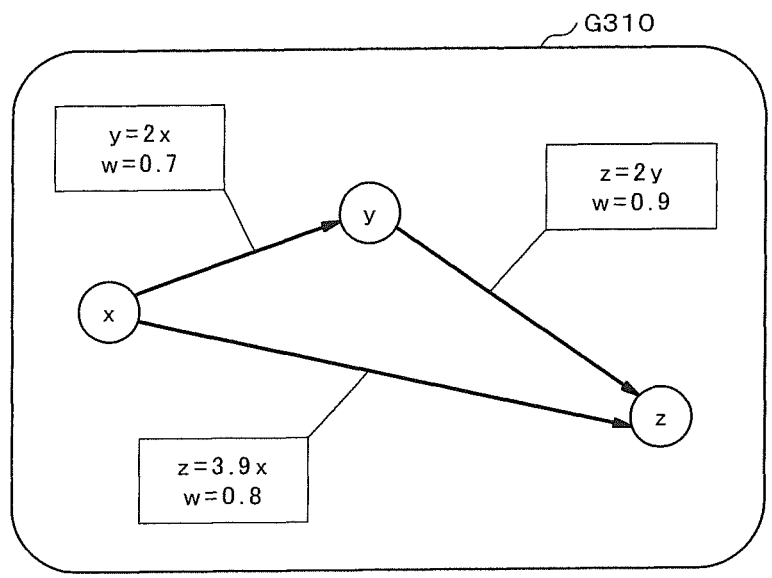
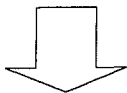
WEIGHT COMPARING PROCESSING IN MODEL SEARCH
1) Compare weight of each route
   route 1 (x-> y-> z): z = 2 (2x) = 4x, w = 0.7*0.9 = 0.63
   route 2 (x-> z)     : z = 3.9x, w = 0.8
2) Calculate predicted value with the selected route
   if x = 10, then z = 3.9*(10) = 39

FIG.10

118a RESOURCE INFORMATION

| NAME | UNIT | MIN | MAX | ... |
|------|------|-----|-----|-----|
| SV1.CPU | % | 0 | 100 | ... |
| ... | ... | ... | ... | ... |
| SV2.CPU | % | 0 | 100 | ... |
| ... | ... | ... | ... | ... |

FIG.19

118b RESOURCE INFORMATION

| NAME | UNIT | MIN | MAX | | GROUP | |
|------|------|-----|-----|---|-------|---|
| SV1.CPU | % | 0 | 100 | ... | — | ... |
| ... | ... | ... | ... | ... | ... | ... |
| A | % | 0 | 100 | ... | — | ... |
| B | % | 0 | 100 | ... | — | ... |
| C | % | 0 | 100 | ... | — | ... |
| ... | ... | ... | ... | ... | ... | ... |
| D | Mbps | 0 | 1000 | ... | — | ... |
| E | Mbps | 0 | 1000 | ... | — | ... |
| ... | ... | ... | ... | ... | ... | ... |
| X | % | 0 | 300 | ... | A,B,C | ... |
| Y | Mbps | 0 | 1000 | ... | D,E | ... |
| ... | ... | ... | ... | ... | ... | ... |

OPERATIONS MANAGEMENT APPARATUS, OPERATIONS MANAGEMENT SYSTEM, DATA PROCESSING METHOD, AND OPERATIONS MANAGEMENT PROGRAM

This application is based upon and claims the benefit of priority from Japanese patent application No. 2008-043047, filed on Feb. 25, 2008, the disclosure of which is incorporated herein in its entirety by reference.

TECHNICAL FILED

The present invention relates to an operations management apparatus, an operations management system, a data processing method and an operations management program, and in particular, relates to an operations management apparatus which analyzes a bottleneck of the performance of an entire system which provides an information and communications service.

BACKGROUND ART

In relatively large scale systems such as a business information system and an IDC (Internet Data Center) system, as the importance of an information and communications service such as a web service and a business service as a social infrastructure rises, stable operation of an apparatus (e.g. a server) providing such services is important. Operations management of such an apparatus has been performed by an administrator manually. As an apparatus becomes more complicated and large-scaled, burden on an administrator associated with knowledge and operation increases by leaps and bounds, causing a situation such as service suspension triggered by an error in judgment and by an operation mistake.

In order to handle such a situation, an integrated operations management system which monitors and controls hardware or software included in a system unitarily is provided.

This integrated operations management system acquires information about an operation status of a plurality of hardware or of software which is an administration object on-line, and outputs it to a display apparatus which is connected to the integrated operations management system. A method to distinguish a failure of a system being an administration object includes a method to set a threshold value to performance information in advance and a method to evaluate a difference from a mean value. When it is determined that there is a failure, the location of the failure is reported.

When the location of the failure has been reported, narrowing down its cause such as whether it is caused by a lack of a memory capacity, an excessive CPU load, an excessive network load or the like is needed for a failure solution. Because clarification of the cause generally requires an examination of system log or a parameter of a computer which might be related to the failure as well as system engineer's experience and sense, time and energy is needed.

For this reason, in an integrated operations management system, it is important to perform handling support by performing an analysis of such as combination of an abnormal states automatically based on event data (state notification) collected from a plurality of equipment, and by presuming a problem and a cause broadly to notify an administrator.

In particular, in order to ensure reliability during long term continual practical use of a service, it is required to detect not only abnormality which has occurred but also a state such as of performance deterioration which is not showing clear abnormality currently or of a sign of a failure expected to occur in the future, and to perform deliberate equipment reinforcement. As a response to such a request, in an integrated operations management system, it is important to analyze a bottleneck of the performance in the entire system.

A technology in relation to such an integrated operations management system includes the followings, for example.

An operations management apparatus in Japanese Patent Application Laid-Open No. 2003-131907 performs performance monitoring in the state of an assumed high load by performing a test which generates input to a system falsely, and identifies an element which will be a bottleneck. This operations management apparatus can analyze behavior of the system when the same load as of the time of the test occurs.

An operations management apparatus in Japanese Patent Application Laid-Open No. 2006-024017 identifies an amount of a load caused by specific processing by comparing the history of the processing of a system element and the history of a change in performance information, and analyzes a load for an amount of the processing in the future. This operations management apparatus can identify behavior of a system when a relation between processing and a load can be figured out in advance.

An operations management apparatus in Japanese Patent Application Laid-Open No. 2002-268922 performs curve approximation of time series variation of individual performance information from the history of the collected performance information and predicts a value in the future. This operations management apparatus derives a situation which can occur from the present performance change as a hypothesis and enumerates candidate elements which can be a bottleneck.

An operations management apparatus in Japanese Patent Application Laid-Open No. 2002-342182 identifies a component which is a cause of a failure by quantifying a magnitude of relation between components of a system based on operation information. This operations management apparatus enumerates candidates of the cause for an element which has become abnormal by weighting and displaying elements with correlation to a performance value as of that moment as a list.

In an operations management apparatus in Japanese Patent Application Laid-Open No. 2006-146668, an operation information collection unit acquires hardware operation information of such as a CPU, a Network IO (network Input/Output) and the like and application operation information of such as access volume of a Web server and a processing query amount of a DB server from a plurality of apparatus in a system which is the target of monitoring at regular time intervals using ICMP, SNMP and rsh, and stores it in operation information DB. A pre-processing unit performs statistical processing which obtains a statistical analytical value between operation information on each constituent element stored in operation information DB. The pre-processing unit finds a statistical analytical value by obtaining the coefficient of correlation between individual operation information or by performing main component analysis between individual operation information, for example. This statistical analytical value indicates the degree of association between operation information on each apparatus in a given time. For example, in FIG. 2 of Japanese Patent Application Laid-Open No. 2006-146668, the coefficient of correlation of the CPU utilization rate of server 1 and the CPU utilization rate of server 2 is 0.93. A coefficient of correlation represents the degree of the correlation between two variables. First, this operations management apparatus periodically acquires hardware operation information such as a CPU utilization rate from a server and a network device and the like which are monitoring targets and, in the case of a Web server, application level information such as access situations, and then calculates "the relation between acquired values" which characterizes each situation using a statistical method such as a correlative analysis and main component analysis from operation information in each situation such as of the time of normal access and of the time of a failure, and defines a model of each situation and hold it in model information DB. Next, at the time of operation, calculation is performed for the current operation information using the same statistical method as the models which have been defined periodically or occasionally triggered by an alert of a failure or by a decline of response of a provided service, and the result thereof is compared with the defined models stored in model information DB to identify the situation of a corresponding model as the situation at present.

In an operations management apparatus in Japanese Patent Application Laid-Open No. 2007-207117, a monitor unit acquires status information related to a state of AC environment and non-AC environment. An analysis unit or a model diagnosis unit judges a state of an apparatus in AC environment based on acquired status information. A simulation unit refers to a countermeasure list corresponding to the judgment result, carries out simulation processing by a countermeasure included in the countermeasure list and evaluates the effect of the each countermeasure. A model extraction unit plots monitoring data of at times 1-3 in a coordinate system representing relation of the usage rate of a CPU to time, and extracts a model which expresses a time series change of the CPU usage rate by obtaining a linear approximation equation ($fa(x)=\alpha x+\beta$) for each monitoring data plotted. A model extraction unit accumulates the extracted model in a knowledge information accumulation unit. Similarly, the model extraction unit obtains a model also in a coordinate system representing relation of the throughput to time. The model extraction unit obtains linear approximation equations ($fTA(x)=\rho 1x+\theta 1$ and $fTB(x)=\rho 2x+\theta 2$) representing correlation between the CPU utilization rate and the throughput for each of processing A and processing B using a correlative analysis and a multivariate analysis to these two models, and extracts a model which indicates a correlation between the CPU utilization rate and the throughput. A model diagnosis unit refers to a policy corresponding to each model respectively and performs diagnosis (see paragraph numbers 0060-0062 of Japanese Patent Application Laid-Open No. 2007-207117).

In Published Japanese translation of PCT application No. 2005-524886 bulletin, a collector is started based on a type of a workload during operation on the computer, and a threshold value for a metrics is set based on the workload. Next, it is determined when the metrics exceeds the threshold value (according to both of the present workload and an predicted workload), and a correlation between each metrics is obtained to judge whether the hardware capacity is the cause of the problem.

SUMMARY

An exemplary object of the invention is to provide an operations management apparatus, an operations management system, a data processing method and an operations management program capable of a bottleneck analysis in which administrator's burden is low and which does not increase the processing load that is also needed for an analysis in the large-scale environment, while enabling to predict a bottleneck which may occur in an actual operational situation correctly.

An operations management apparatus which acquires performance information for each of a plurality of performance items from a plurality of controlled units and manages operation of the controlled units according to an exemplary aspect of the invention includes a correlation model generation unit which derives, when the performance items or the controlled units are designated as an element of performance information, a correlation function between a first series of performance information that indicates time series variation about a first element and a second series of performance information that indicates time series variation about a second element, generates a correlation model between the first element and the second element based on the correlation function, and obtains the correlation model for each element pair of the performance information, and a model searching unit which searches for the correlation model for each element between an input element and an output element among elements of the performance information in series, and predicts a value of the output element from a value of the input element based on the searched correlation model.

An operations management system according to an exemplary aspect of the invention includes a plurality of controlled units, an operations management apparatus which acquires performance information for each of a plurality of performance items from the controlled units and manages operation of the controlled units, wherein the operations management apparatus including a correlation model generation unit which derives, when the performance items or the controlled units are designated as an element of performance information, a correlation function between a first series of performance information that indicates time series variation about a first element and a second series of performance information that indicates time series variation about a second element, generates a correlation model between the first element and the second element based on the correlation function, and obtains the correlation model for each element pair of the performance information, and a model searching unit which searches for the correlation model for each element between an input element and an output element among elements of the performance information in series, and predicts a value of the output element from a value of the input element based on the searched correlation model.

A data processing method of an operations management apparatus which acquires performance information for each of a plurality of performance items from a plurality of controlled units and manages operation of the controlled units according to an exemplary aspect of the invention includes obtaining a correlation model for each element pair of the performance information by deriving, when the performance items or the controlled units are designated as an element of the performance information, a correlation function between a first series of performance information that indicates time series variation about a first element and a second series of the performance information that indicates time series variation about a second element and by generating the correlation model between the first element and the second element based on the correlation function, and predicting, by searching for the correlation model for each element between an input element and an output element among elements of the performance information in series, a value of the output element from a value of the input element based on the searched correlation model.

A computer readable medium embodying a program, the program causing an operations management apparatus which acquires performance information for each of a plurality of performance items from a plurality of controlled units and manages operation of the controlled units to perform a method, according to an exemplary aspect of the invention includes obtaining a correlation model for each element pair of the performance information by deriving, when the performance items or the controlled units are designated as an element of the performance information, a correlation function between a first series of performance information that indicates time series variation about a first element and a second series of the performance information that indicates time series variation about a second element and by generating the correlation model between the first element and the second element based on the correlation function, and predicting, by searching for the correlation model for each element between an input element and an output element among elements of the performance information in series, a value of the output element from a value of the input element based on the searched correlation model.

An operations management apparatus which acquires performance information for each of a plurality of performance items from a plurality of controlled units and manages operation of the controlled units according to an exemplary aspect of the invention includes a correlation model generation means for obtaining a correlation model for each element pair of the performance information by deriving, when the performance items or the controlled units are designated as an element of the performance information, a correlation function between a first series of performance information that indicates time series variation about a first element and a second series of the performance information that indicates time series variation about a second element and by generating the correlation model between the first element and the second element based on the correlation function, and a model searching means for predicting, by searching for the correlation model for each element between an input element and an output element among elements of the performance information in series, a value of the output element from a value of the input element based on the searched correlation model.

A data processing method of an operations management apparatus which acquires performance information for each of a plurality of performance items from a plurality of controlled units and manages operation of the controlled units according to an exemplary aspect of the invention includes a step for obtaining a correlation model for each element pair of the performance information by deriving, when the performance items or the controlled units are designated as an element of the performance information, a correlation function between a first series of performance information that indicates time series variation about a first element and a second series of the performance information that indicates time series variation about a second element and by generating the correlation model between the first element and the second element based on the correlation function and a step for predicting, by searching for the correlation model for each element between an input element and an output element among elements of the performance information in series, a value of the output element from a value of the input element based on the searched correlation model.

BRIEF DESCRIPTION OF THE DRAWINGS

Exemplary features and advantages of the present invention will become apparent from the following detailed description when taken with the accompanying drawings in which:

FIG. 3 is an exemplary diagram of performance information used by an operations management apparatus of the first exemplary embodiment.

FIG. 8 is an exemplary diagram of a data structure of a correlation model in an operations management apparatus of the first exemplary embodiment.

FIG. 9 is an exemplary diagram of weight comparison in an operations management apparatus of the first exemplary embodiment.

FIG. 10 is an exemplary diagram of a data structure of resource information in an operations management apparatus of the first exemplary embodiment.

FIG. 19 is an exemplary diagram of a data structure of resource information in an operations management apparatus of the second exemplary embodiment.

EXEMPLARY EMBODIMENT

[Basic Configuration of Operations Management Apparatus]

First, a basic configuration of an operations management apparatus will be described. An operations management apparatus (shown by symbol "100" in FIG. 5, for example) of the present exemplary embodiment acquires performance information for each of a plurality of performance items from a plurality of controlled units of a system and manages the operation of the controlled units.

This operations management apparatus includes: a correlation model generation unit (shown by symbol "123" in FIG. 5, for example) which derives, when the performance items or the controlled units are designated as an element of performance information, a correlation function between a first series of performance information that indicates time series variation about a first element and a second series of performance information that indicates time series variation about a second element, generates a correlation model between the first element and the second element based on the correlation function, and obtains the correlation model for each element pair of the performance information; and a model searching unit (shown by symbol "124" in FIG. 5, for example) which searches for the correlation model for each element between an input element and an output element among elements of the performance information successively, and predicts a value of the output element from a value of the input element based on the searched correlation model.

Figure 5:
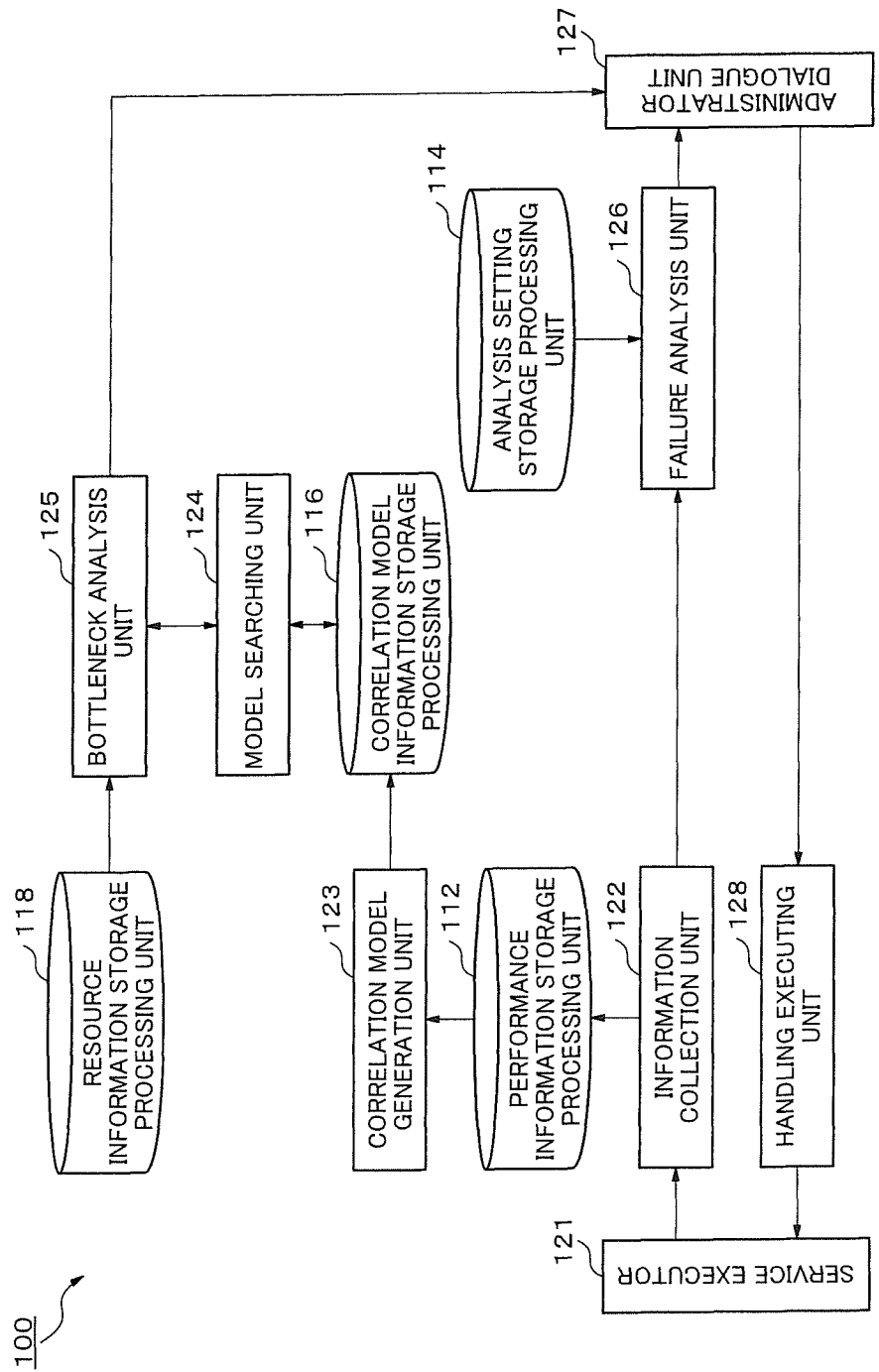
FIG. 5 is an exemplary block diagram of the entire structure of the operations management apparatus of the first exemplary embodiment.

The operations management apparatus may further includes: a bottleneck analysis unit which generates, based on resource information which specifies a range of a value of an element of the performance information, when a predicted value of the output element predicted by the model searching unit exceeds the range, a bottleneck analysis result including the output element and the value of the output element (shown by symbol "125" in FIG. 5, for example).

In this operations management apparatus, the correlation model generation unit generates a correlation model of the overall operating states of the service executor as a transform function between elements of performance information. When a value of one element (input element) of performance information is assumed, a value of another element (output element) is predicted by the model searching unit by tracing the transform functions in this correlation model in sequence.

Bottleneck analysis unit receives, while increasing and decreasing the value of the one element (input element) in sequence, a value of another element (output element) predicted by the model searching unit and when a predicted value of the element (output element) exceeds a limit, generates an analysis result including the output element and the value of the input element as of that moment.

Thus, this operations management apparatus can analyze a bottleneck in conformity with a situation at the time of operation including situations failed to have been assumed at the time of a test, by generating a correlation model of performance information automatically from detected performance information to perform a bottleneck analysis.

This operations management apparatus can analyze not only behavior related to specific processing which is assumed in advance but also whole behavior of the service executor comprehensively.

Further, influence of performance information from other elements is reflected to the one element by a correlation model. Accordingly, the operations management apparatus can figure out and extract an element which will be a bottleneck in the future in the overall operation statuses of a system by a correlation model between each element of performance information.

That is, verification of an analysis result does not need to be depended on administrator's experience, because the operations management apparatus can extract a bottleneck with a high possibility to occur in the targeted system in the future based on a correlation between elements of performance information detected in actual practical use.

Also, a correlation model generated includes a transform function that converts between elements of performance information in 1 to 1. Accordingly, the operations management apparatus can derive other elements from one element of performance information easily, and even if a system is magnified, can analyze a bottleneck without the amount of processing becoming enormous.

Thus, the present exemplary embodiment solves an issue of related technology by extracting and modeling a correlation between elements of detected performance information appropriately, and consequently can predict a bottleneck which may occur in an actual operational situation correctly. The present exemplary embodiment enables a bottleneck analysis in which administrator's burden is low and which does not increase the processing load that is also needed for an analysis in the large-scale environment, Hereinafter, exemplary embodiments in which such an operations management apparatus is applied to the operations management system will be described.

[First Exemplary Embodiment]

(Entire Structure of Operations Management System)

First, regarding the concrete configuration of an operations management system in a first exemplary embodiment, the entire structure is described, followed by a description of a detailed structure of each part.

Figure 1:
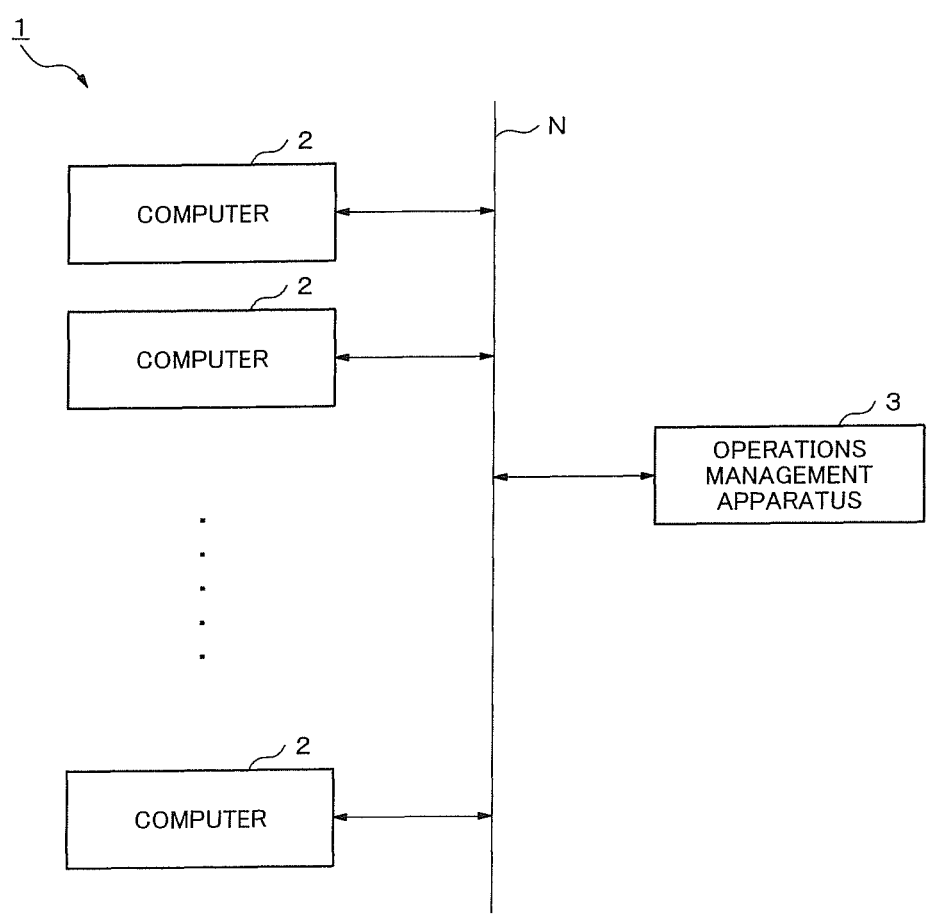
FIG. 1 is an exemplary block diagram of the entire structure of the operations management system including an operations management apparatus of a first exemplary embodiment.

FIG. 1 is an exemplary block diagram of the entire structure of an operations management system including an operations management apparatus of the first exemplary embodiment.

As shown in FIG. 1, operations management system 1 in the first exemplary embodiment includes computers 2 which are a plurality of controlled units, operations management apparatus 3 which is capable of communicating with computers 2 via network N, and manages the operation of computers 2.

Operations management apparatus 3 acquires performance information for each of a plurality of performance items (a CPU utilization factor and remaining memory capacity, for example) from the plurality of computers 2.

Computer 2 and operations management apparatus 3 may be any computer if it is operated by program control and includes a network related function, such as a desktop computer, a laptop computer, a server, or some other information devices having wireless or wired communication functions or a computer similar to this. Computer 2 and operations management apparatus 3 may be of a portable type or a stationary type.

The hardware configuration of operations management apparatus 3 includes a display unit (screen) indicating various information or the like, an operation input unit (such as a keyboard and a mouse, for example) performing operational input of data on the display screen of the display unit (such as on various input columns), a transmission and reception unit (a communication unit) sending and receiving various signals and data, a memory unit (such as a memory and a hard disk, for example) storing various programs and various data, a control unit (such as CPU, for example) which controls these units, and the like.

Computer 2 also may be a network device or other equipment, or a mainframe.

(Premised Configuration)

Here, the configuration of an operations management apparatus which is a premise of the first exemplary embodiment will be described referring to FIG. 2, FIG. 3 and FIG. 4 before describing the characteristic configuration of the first exemplary embodiment.

Figure 2:
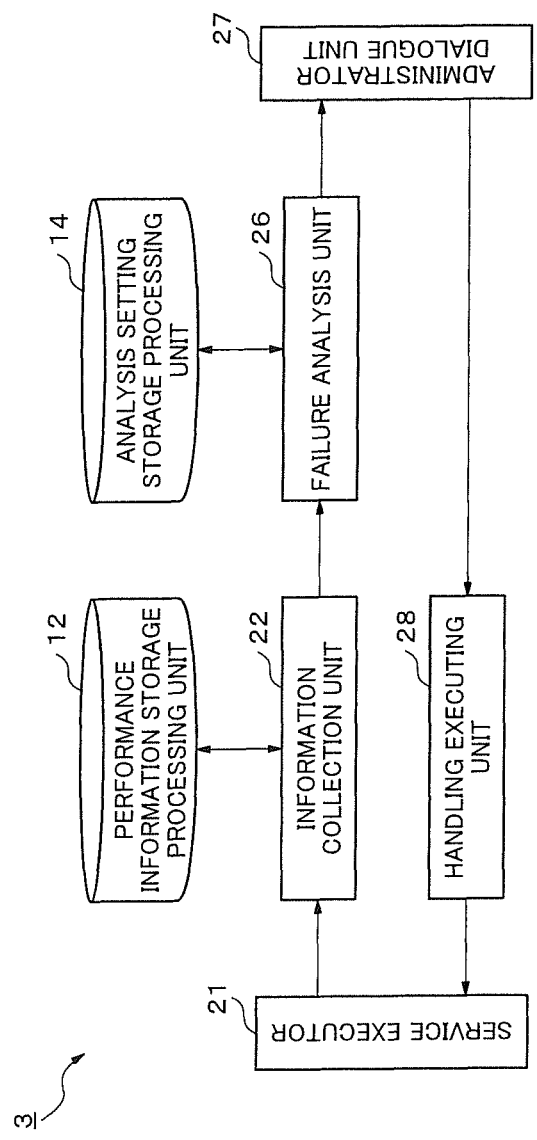
FIG. 2 is an exemplary block diagram of a configuration which is the premise of the operations management apparatus of the first exemplary embodiment.

FIG. 2 is an exemplary block diagram of a configuration which is the premise of an operations management apparatus of the first exemplary embodiment. Referring to FIG. 2, operations management apparatus 3 which indicates the configuration which is the premise of the first exemplary embodiment includes service executor 21, performance information storage processing unit 12, information collection unit 22, analysis setting storage processing unit 14, failure analysis unit 26, administrator dialogue unit 27 and handling executing unit 28.

Service executor 21 provides an information and communications service such as a web service and a business service. Service executor 21 may be on another independent computer or the like.

Performance information storage processing unit 12 accumulates each element of performance information of service executor 21.

Information collection unit 22 detects an operation state of service executor 21 and accumulates in performance information storage processing unit 12 performance information included in the operation state.

Analysis setting storage processing unit 14 accumulates an analysis setting to detect abnormality of service executor 21.

Failure analysis unit 26 receives an operation state from information collection unit 22 and performs failure analysis according to the analysis setting of analysis setting storage processing unit 14.

Administrator dialogue unit 27 receives a result of the failure analysis from failure analysis unit 26 and presents it to an administrator. Administrator dialogue unit 27 accepts administrator's input and instructs handling executing unit 28 to handle a failure according to administrator's input.

Handling executing unit 28 carries out processing which is handling for the failure on service executor 21 according to the instruction of administrator dialogue unit 27.

FIG. 3 is an exemplary diagram of performance information used by an operations management apparatus of the first exemplary embodiment. FIG. 3 shows performance information outputted by information collection unit 22 and accumulated in performance information storage processing unit 12. Each line of performance information 12*a* includes values for each performance item (element) at the same point of time, and the values are listed at regular time intervals.

Figure 4:
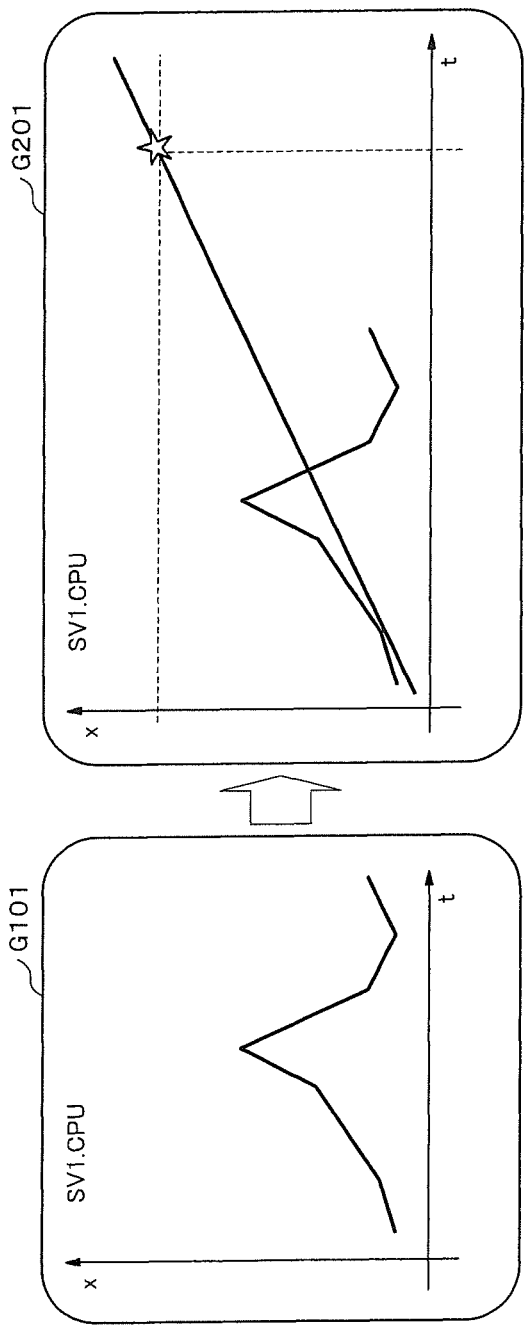
FIG. 4 is an exemplary diagram of a graph of time series variation of performance information used by an operations management apparatus of the first exemplary embodiment.

FIG. 4 is an exemplary diagram of a graph of time series variation of performance information used by an operations management apparatus of the first exemplary embodiment. FIG. 4 indicates time series variation of one element included in the performance information. Graph G101 indicates time series variation of SV1-CPU included in performance information 12*a* shown in FIG. 3. Graph G201 is an example of linear prediction of time series variation of graph G101.

Operation of operations management apparatus 3 having the premised configuration mentioned above will be described using FIG. 2, FIG. 3 and FIG. 4.

First, information collection unit 22 of FIG. 2 detects an operation state of service executor 21 and accumulates performance information in performance information storage processing unit 12. For example, when a web service is carried out by service executor 21, information collection unit 22 detects CPU utilization rate and remaining memory capacity of each server which provides the web service at regular time intervals.

Performance information 12*a* of FIG. 3 is an example of the detected performance information. For example, SV1-CPU indicates a value of a CPU utilization factor of one server, and the value at time 17:25 of Oct. 5, 2007 is 12. The values of 15, 34 and are detected at one minute intervals from 17:26. Similarly, SV1-MEM is the value of the remaining memory capacity of the same server and SV2-CPU is the value of the CPU utilization factor of a different server detected at the same time of day.

Next, failure analysis unit 26 performs a failure analysis according to a analysis setting accumulated in analysis setting storage processing unit 14. As an analysis setting, a detection condition of a failure is designated such as when the CPU utilization factor exceeds a certain value, a warning message is presented to an administrator, for example. Failure analysis unit 26 determines whether a load of a specific server has become high or not from the value of the performance information detected by information collection unit 22 using a threshold value according to an analysis setting.

Administrator dialogue unit 27 presents a result of such failure analysis to an administrator. When an administrator performs an input operation which directs administrator dialogue unit 27 to perform some handling for the result of the failure analysis, administrator dialogue unit 27 carries out a handling command on service executor 21 via handling executing unit 28.

For example, when knowing that a CPU load has become high, the administrator reduces the amount of services or performs a configuration change for load sharing.

When a value of the performance information collected by information collection unit 22 at regular time intervals decreases after this, failure analysis unit 26 determines that the failure has been recovered and shows the result to the administrator via administrator dialogue unit 27. By a repeat of processing of such an information collection, analysis and handling, failure handling for service executor continues to be performed.

Here, in an operations management apparatus in Japanese Patent Application Laid-Open No. 2003-131907, a function corresponding to service executor 21 of operations management apparatus 3 carries out processing which is expected to cause an assumed heavy load state. This processing is such as generating access from a large number of clients of a web service falsely. In this state, through collection of performance information from a function corresponding to service executor 21 by a function corresponding to information collection unit 22 of operations management apparatus 3 and analysis by a function corresponding to failure analysis unit 26, an administrator can learn which element of the system will become abnormal in the assumed heavy load state.

For example, when a load as shown in graph G101 of FIG. 4 is obtained and its peak value exceeds a threshold value and reaches a critical region which is found in advance, an administrator can find the processing power of SV1 will be lacking.

Conversely, when all of the performance information is within a threshold value, the administrator can learn the system is safe for the assumed load.

In this Japanese Patent Application Laid-Open No. 2003-131907, performance information on a system in a case of an assumed heavy load state can be analyzed correctly. However, not all heavy load states which have a possibility of occurring in the future in a system can be tested beforehand. For example, by a test which generates access found when clients use a service averagely, fault tolerance in average use can be secured. However, it is difficult to test access leaning to a specific service according to changes in user's taste and social situation. Accordingly, when use of a system is prolonged, an unexpected element will be a bottleneck by unexpected use. Consequently, failures occur by this bottleneck.

In an operations management apparatus in Japanese Patent Application Laid-Open No. 2006-024017, such analysis is performed more in detail. In an operations management apparatus in Japanese Patent Application Laid-Open No. 2006-024017, a function corresponding to information collection unit 22 of operations management apparatus 3 collects the history of processing which has been performed in a function corresponding to service executor 21 of operations management apparatus 3 in addition to performance information, and a function corresponding to failure analysis unit 26 of operations management apparatus 3 analyzes the performance information and the processing history all together.

For example, by collecting the detailed execution history of processing for which a relation with a CPU load is known in advance, a CPU utilization factor can be predicted from timing that the processing is performed. That is, when knowing by which processing the peak value in graph G101 of FIG. 4 is caused, a future load of SV1-CPU can be predicted from timing that the processing is carried out.

In this Japanese Patent Application Laid-Open No. 2006-024017, a detailed failure analysis can be performed for processing for which causal relation with performance information is made clear in advance. However, when causality becomes complicated as well as the processing load is increased in order to perform additional collection of the history of the processing, it will be difficult for an administrator to understand a result of analysis.

In particular, in recent years, the importance of an IT system as a social infrastructure has been increasing, and scale of a system has become large and it often cooperates with other systems. In such a situation, advanced knowledge to analyze complicated causality is needed for an administrator, because an enormous processing history is collected.

In an operations management apparatus in Japanese Patent Application Laid-Open No. 2002-268922, a load is predicted from time series variation of performance information, not from the relation with processing. In an operations management apparatus in Japanese Patent Application Laid-Open No. 2002-268922, a function corresponding to failure analysis unit 26 of operations management apparatus 3 analyzes the tendency of time series variation of detected performance information and predicts a change in the performance information in the future.

For example, the operations management apparatus derives that a value of SV1-CPU has a tendency of monotonic increase as shown in graph G201 from time series variation as shown in graph G101 of FIG. 4. The operations management apparatus predicts time when a CPU load will reach to a critical region from an increased percentage of SV1-CPU. By predicting time when other elements reach a critical region similarly, the operations management apparatus can find out an element expected to reach a critical region earliest in the entire system.

In this Japanese Patent Application Laid-Open No. 2002-268922, a possibility of each element of performance information to be a bottleneck in the future can be shown to an administrator. However, the administrator has to judge from his/her experience whether these bottlenecks can occur actually.

For example, when remaining memory capacity is below a predetermined value, if a recovery of the memory capacity is waited for without beginning of new processing, whether monotonous increase will be also observed in a CPU load in the future like the tendency of a certain time point is not clear unless a change in remaining memory capacity is taken into account.

In order to judge the validity of a result of the tendency prediction, an administrator has to understand a correlation between elements which exist in a system correctly.

In an operations management apparatus in Japanese Patent Application Laid-Open No. 2002-342182, a correlation between elements of a system is analyzed. In an operations management apparatus in Japanese Patent Application Laid-Open No. 2002-342182, when a function corresponding to failure analysis unit 26 of operations management apparatus 3 finds abnormality of performance information on a system element, a list of components having a correlation with the value of the performance information at that time is generated from performance information received from information collection unit 22, and it is shown to an administrator by a function corresponding to administrator dialogue unit 27.

For example, when abnormality of SV1-CPU is found in performance information 12*a* of FIG. 3, the operations management apparatus performs multi regression analysis of the values of SV1-MEM and SV2-CPU and the values of SV1-CPU, and enumerates elements regarded as having a high correlation.

As a result, the administrator can learn that the abnormality of SV1-CPU may have been caused by SV1-MEM.

In this Japanese Patent Application Laid-Open No. 2002-342182, the operations management apparatus can show a possibility of a certain abnormality and causality to an administrator. However, the administrator has to perform verification whether that is right or not. The operations management apparatus also can show a correlation between the values of the detected performance information to an administrator. However, the operations management apparatus cannot derive which element will be a bottleneck for a load with a possibility to occur in the future.

As stated above, in an actual operational situation, there is a problem that an operations management apparatus of the related technology cannot predict correctly a bottleneck which will occur, and burdens of an administrator is large and the processing load of the information collection and the analysis is heavy.

Accordingly, in the first exemplary embodiment, there is a characteristic configuration indicated below.

(Characteristic Composition of the First Exemplary Embodiment)

Here, the characteristic configuration of an operations management apparatus of the first exemplary embodiment will be described with reference to FIG. 5. FIG. 5 is an exemplary block diagram of the entire structure of an operations management apparatus of the first exemplary embodiment.

As shown in FIG. 5, operations management apparatus 100 of the first exemplary embodiment includes correlation model generation unit 123, correlation model information storage processing unit 116, model searching unit 124, resource information storage processing unit 118 and bottleneck analysis unit 125 as well as service executor 121, performance information storage processing unit 112, information collection unit 122, analysis setting storage processing unit 114, failure analysis unit 126, administrator dialogue unit 127 and handling executing unit 128 which are the same configurations as operations management apparatus 3 shown in FIG. 2.

Correlation model generation unit 123 takes out performance information for a certain period from performance information storage processing unit 112, and derives, for time series of two discretionary elements of the performance information, a transform function when making one element as input and making the other as output. Then, correlation model generation unit 123 compares a series of values of the element generated by this transform function and a series of an actual detected value, and calculates the weight of the transform function from the difference between those values. By repeating these processing for all element pairs, correlation model generation unit 123 generates a correlation model of the overall operating state of service executor 121.

Correlation model information storage processing unit 116 accumulates the correlation model generated by correlation model generation unit 123.

By tracing a transform function between each of the elements of the correlation model accumulated in correlation model information storage processing unit 116 in sequence, model searching unit 124 predicts the value of another element (output element) when a value of one element (input element) among the elements of performance information is supposed. When different values are predicted to one element by a plurality of transform functions, one value is selected based on the weight.

Resource information storage processing unit 118 accumulates resource information which is information describing attributes such as the maximum value, the minimum value and the unit of a value for each performance item (element).

Bottleneck analysis unit 125 instructs model searching unit 124 to perform model search while increasing or decreasing successively a value of one input element designated in advance among the elements of the performance information. Bottleneck analysis unit 125 receives the value of another element (output element) which model searching unit 124 has predicted and compares it with the resource information accumulated in resource information storage processing unit 118. When the value of the output element predicted by model searching unit 124 exceeds the range indicated in the resource information, bottleneck analysis unit 125 generates an analysis result including the output element and the value of the input element at that time, and outputs the analysis result to administrator dialogue unit 127.

Figure 6:
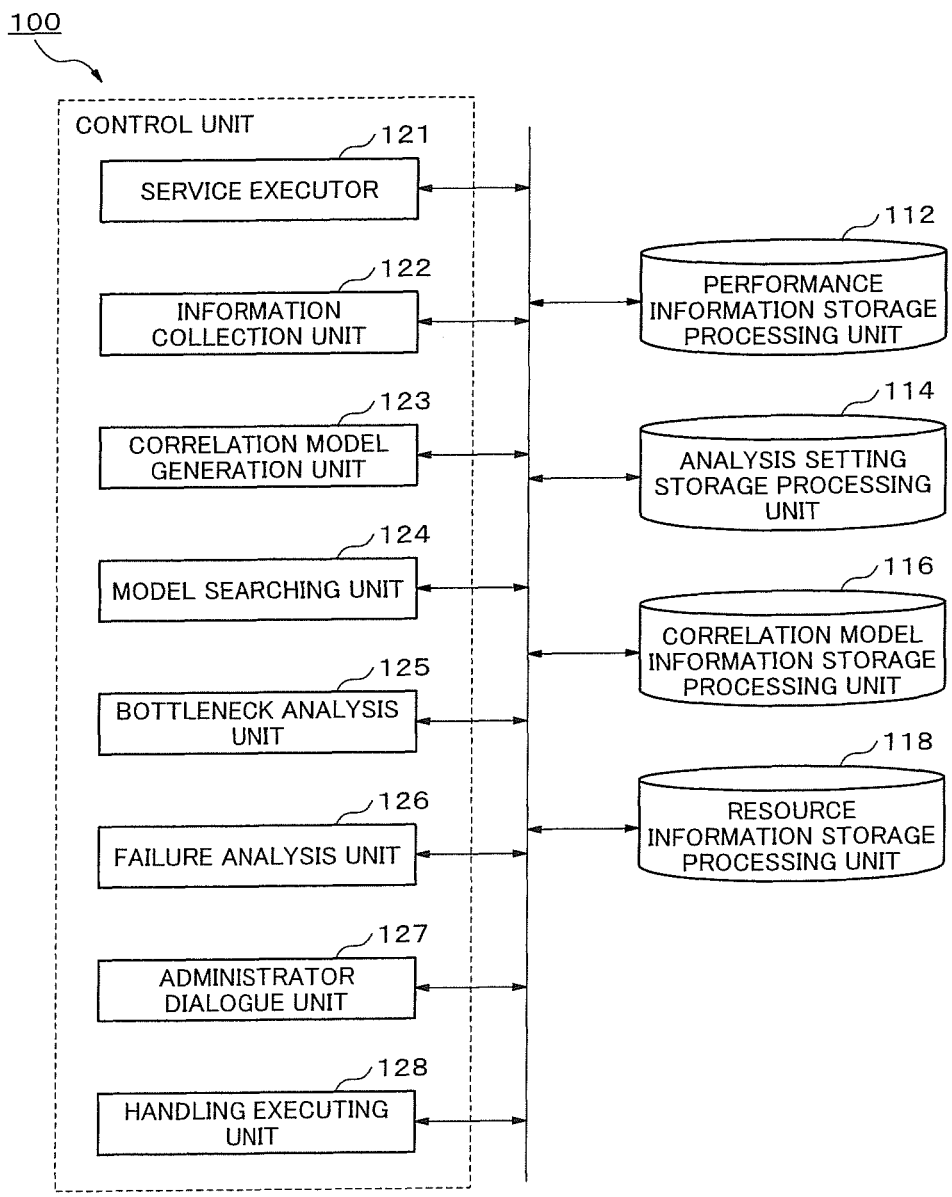
FIG. 6 is another exemplary block diagram of the entire structure of the operations management apparatus of the first exemplary embodiment.

FIG. 6 is another exemplary block diagram of the entire structure of the operations management apparatus of the first exemplary embodiment. As shown in FIG. 6, each unit of operations management apparatus 100 may include a plurality of functions of a control unit.

When the above-mentioned performance items or controlled units are designated as an element of performance information, correlation model generation unit 123 may derive a correlation function between a first series of performance information that indicates time series variation about a first element and a second series of performance information that indicates time series variation about a second element, and generate a correlation model between the first element and the second element based on the correlation function, and obtains the correlation model for respective element pairs of the performance information.

Then, model searching unit 124 may search for the correlation model for each element between an input element and an output element among elements of the performance information in series, and predict a value of the output element from a value of the input element based on the searched correlation model.

Further, bottleneck analysis unit 125 may generate, based on resource information which specifies a range of a value of an element of the performance information, when a predicted value of the output element predicted by the model searching unit exceeds the range, a bottleneck analysis result including the output element and the value of the output element.

Correlation model generation unit 123 calculates a weight of a correlation model between each of the elements based on an error between a value of a second element predicted from a value of the first element using the correlation function and a value of the second element acquired. In this case, model searching unit 124 determines, when different values can be predicted depending on a plurality of correlation models for the output elements, a value of the output elements based on the weight.

Correlation model generation unit 123 may calculate a first weight of the correlation model of the first element and the second element, a second weight of the correlation model of the first element and a third element and a third weight of the correlation model of the third element and the second element, respectively. In this case, model searching unit 124 compare an aggregated weight of the second weight and the third weight to the first weight, and predict a value of the output element.

Also, the bottleneck analysis unit 125 may include the element sequenced in order of a rate of utilization in the bottleneck analysis result. Bottleneck analysis unit 125 may include the input element and a value of the input element at the moment when a value of the output element exceeds the range in the bottleneck analysis result.

(Correlation Model Generation)

Figure 7:
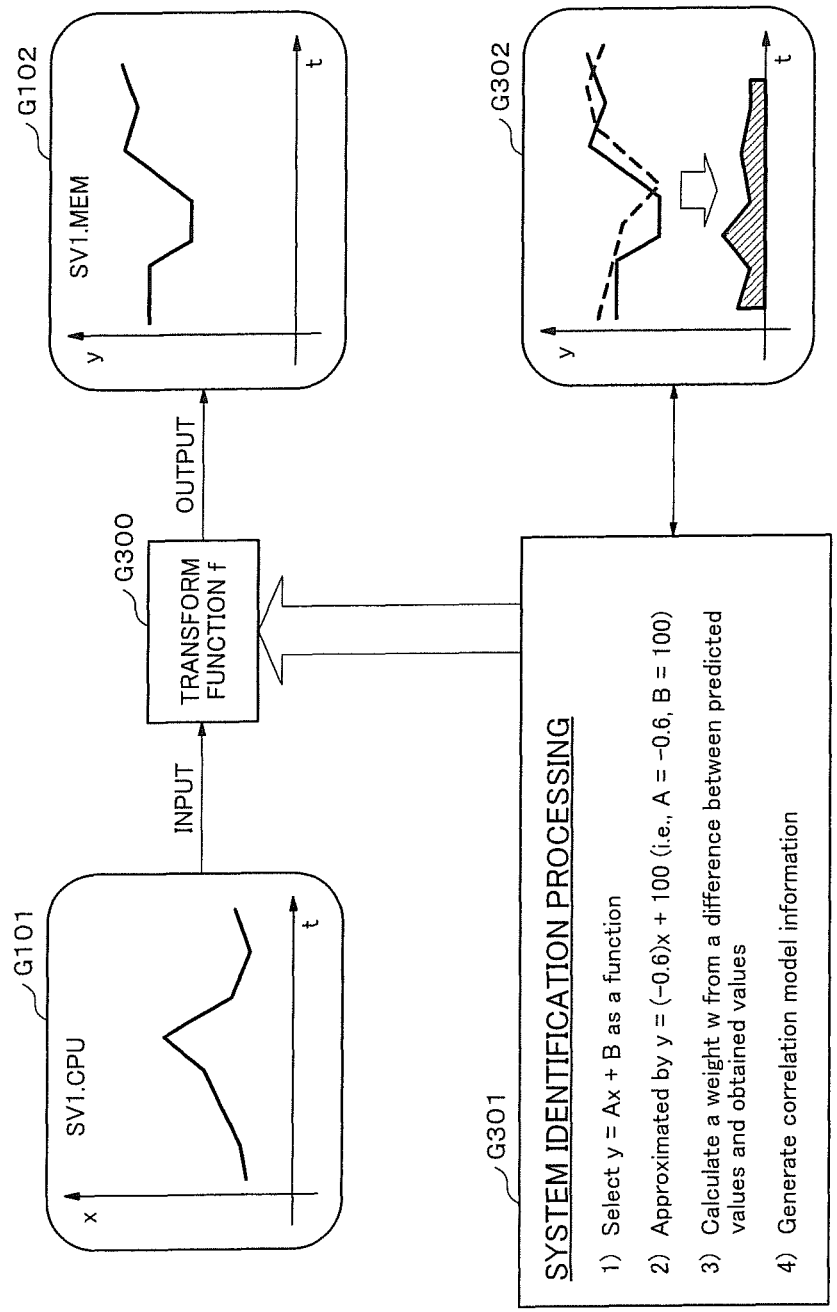
FIG. 7 is an exemplary diagram of transform function identification in an operations management apparatus of the first exemplary embodiment.

Here, the outline of correlation model generation by correlation model generation unit 123 will be described with reference to FIG. 7. FIG. 7 is an exemplary diagram of transform function identification in an operations management apparatus of the first exemplary embodiment.

Figure 12:
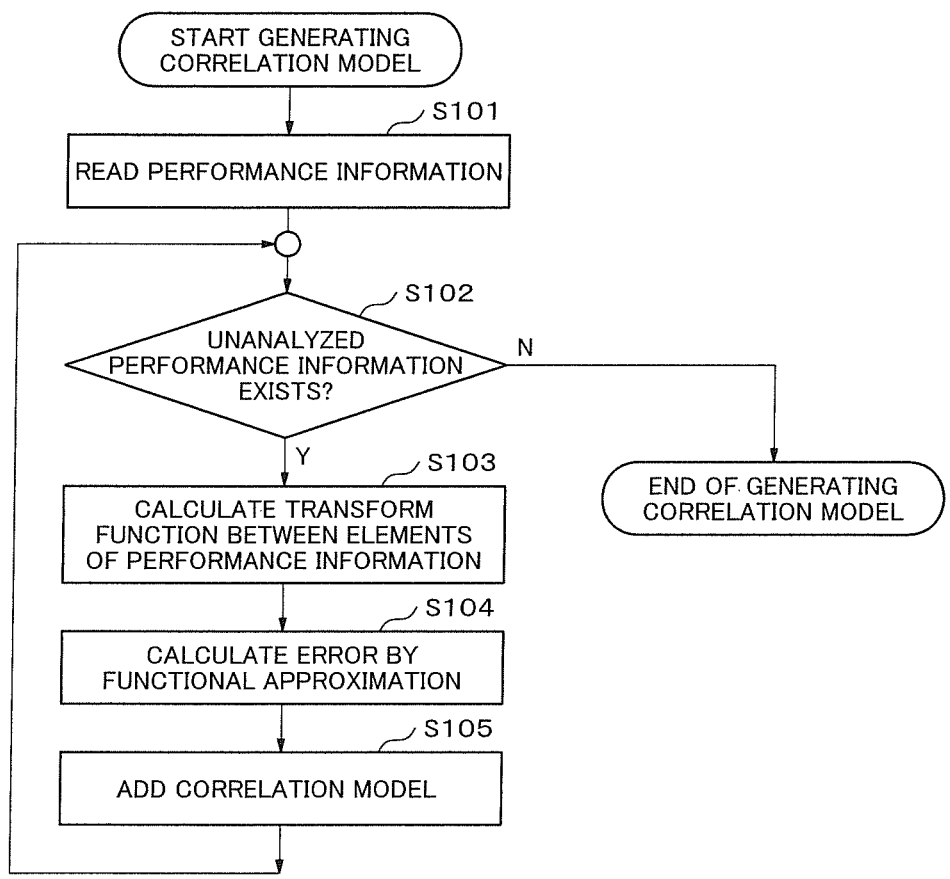
FIG. 12 is an exemplary flowchart of a detailed processing procedure of correlation model generation in an operations management apparatus of the first exemplary embodiment.

Generation of a correlation function can be performed by processing of Step S103 (a correlation function generation function) shown in FIG. 12 to generate a correlation function (transform function) and Step S104 (a weight calculation function) to calculate an error.

As shown in FIG. 7, transform function G300 takes a series of the values of SV1-CPU indicated in graph G101 (a first series of performance information) as input, and outputs a series of the values of SV1-MEM indicated in graph G102 (a second series of performance information).

Correlation model generation unit 123 calculates this transform function G300 by system identification processing G301.

For example, correlation model generation unit 123 calculates $A=-0.6$ and $B=100$ for a transform function indicated by a formula of $y=Ax+B$.

As indicated in graph G302, correlation model generation unit 123 generates a weight w from a difference between the series of predicted values of an element of performance information generated from graph G101 using this transform function and a series of values of the element of performance information detected actually as indicated in graph G102.

Here, weight w may be defined as value 0-1 representing the magnitude of a difference (prediction error) between a series of values of an element predicted by this transform function and a series of values detected actually, for example. In this case, the larger the difference (prediction error) is, the smaller weight w is, and the smaller the difference (prediction error) is the larger weight w is. In this case, weight w may be a value corresponding to a percentage of a predicted value which is matched with a detected value, and it may be 1 when a series of predicted values and a series of detected values are identical completely, and when they are not identical at all. Alternatively, weight w may be a value which includes the degree of a difference when a predicted value is not identical with a detected value.

FIG. 8 is an exemplary diagram of a data structure of a correlation model in an operations management apparatus of the first exemplary embodiment. Correlation model 116a includes an element (a performance item) of performance information which is assigned as input of a transform function, an element (a performance item) of the performance information which is assigned as output, a value of each coefficient that specifies a transform function and a weight. For example, when the transform function is y=Ax+B as shown in FIG. 7, the value −0.6 of the coefficient A, the value 100 of the coefficient B and the weight 0.88 are accumulated for SV1-CPU and SV1-MEM.

(Model Search)

Next, the outline of model search by model searching unit 124 will be described with reference to FIG. 9. FIG. 9 is an exemplary diagram of weight comparison in an operations management apparatus of the first exemplary embodiment.

Figure 13:
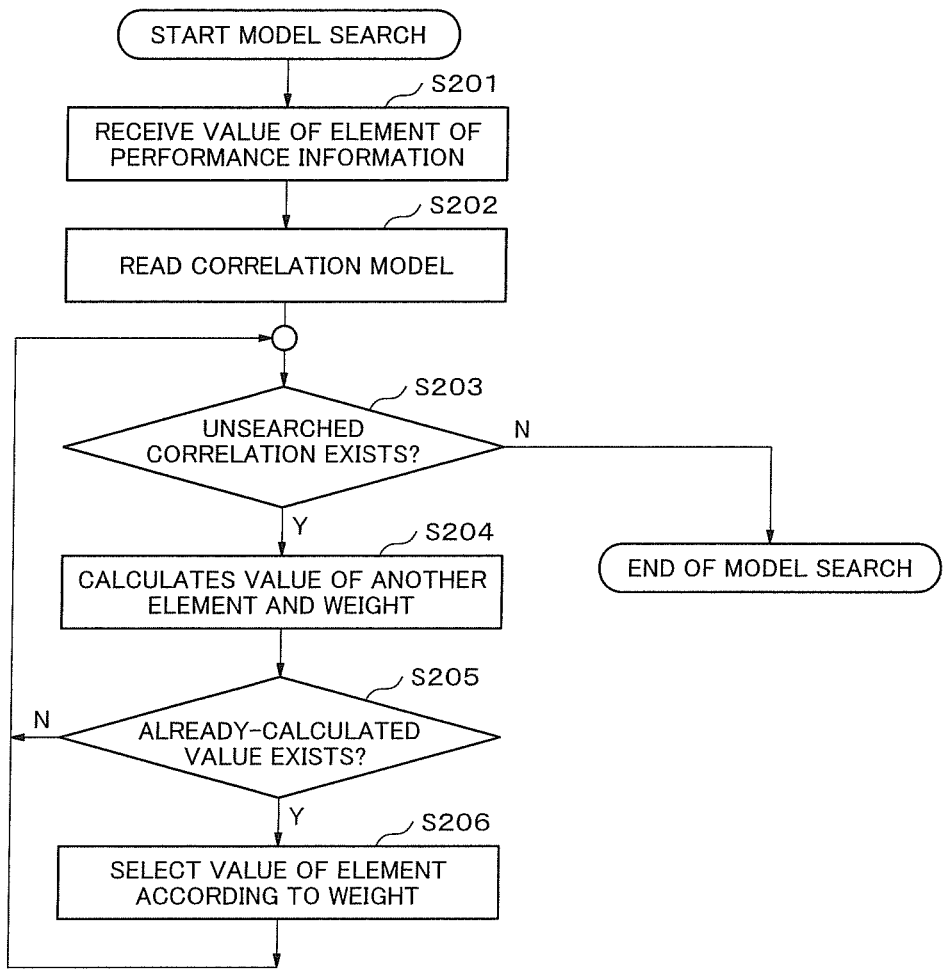
FIG. 13 is an exemplary flowchart of a detailed processing procedure of model search in an operations management apparatus of the first exemplary embodiment.

Model search using a weight is performed at Step S206 shown in FIG. 13 for selecting a value of an element of performance information.

In correlation graph G310 of FIG. 9, as transform functions between element x, y and z, there are y=2x, z=2y, z=3.9x. A weight w of the respective transform functions is 0.7, 0.9 and 0.8. When a value of z is calculated, model searching unit 124 compares the weight 0.63 of the route x->y->z and the weight 0.8 of the route x->z. Model searching unit 124 selects the route x->z which has a larger value. As a result, in case of x=10, model searching unit 124 calculates the value 39 of z by applying the formula of z=3.9x.

(Bottleneck Analysis)

In a bottleneck analysis by bottleneck analysis unit 125, determination of whether performance information predicted by model searching unit 124 based on resource information exceeds a limit or not is made.

FIG. 10 is an exemplary diagram of a data structure of resource information in an operations management apparatus of the first exemplary embodiment. Resource information 118a includes the name (a performance item) of an element of performance information of a system, the unit, the minimum and the maximum of a value.

Bottleneck analysis unit 125 may indicate an analysis result on a display unit.

Figure 15:
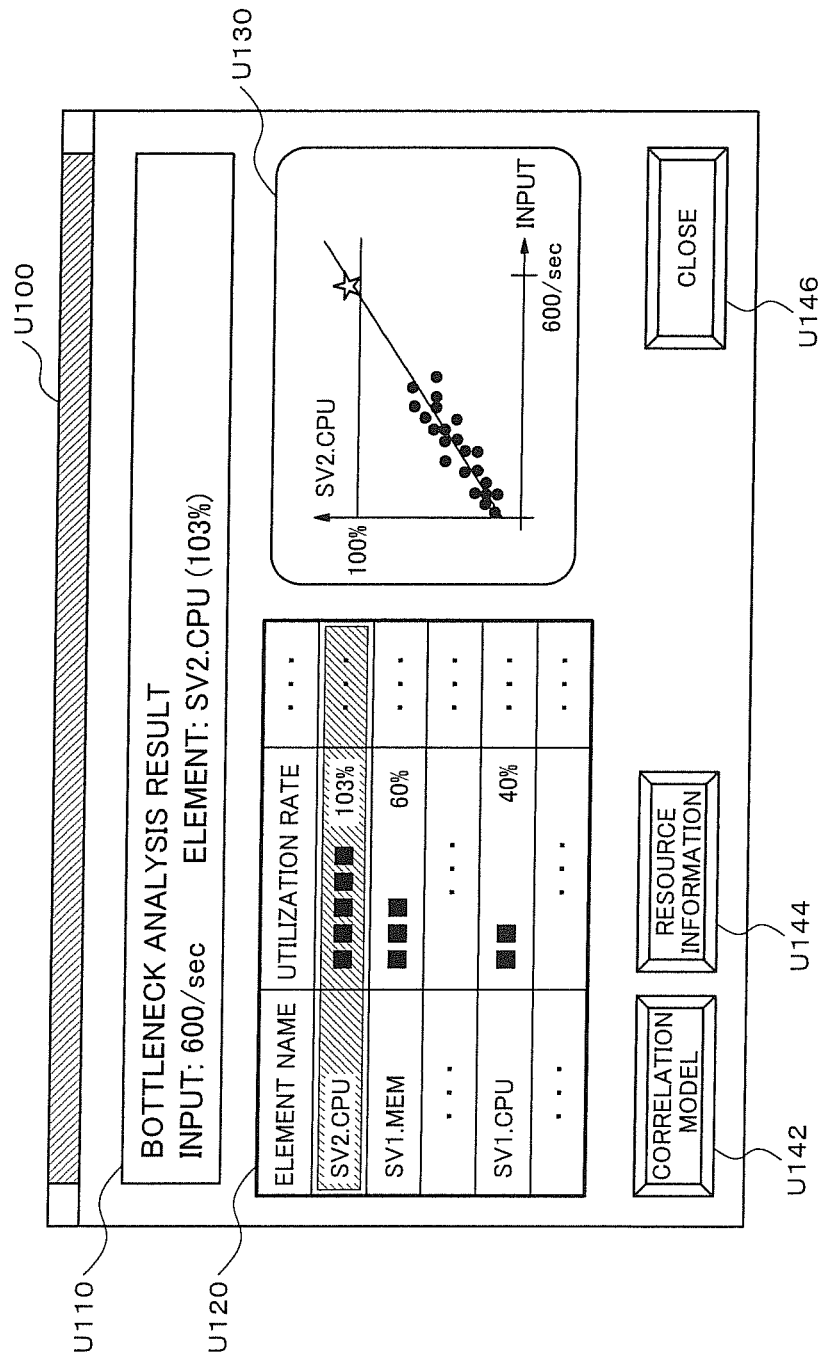
FIG. 15 is an exemplary diagram of an indicated display screen in an operations management apparatus of the first exemplary embodiment.

FIG. 15 is an exemplary diagram of a display screen in an operations management apparatus of the first exemplary embodiment. In FIG. 15, a display screen in a bottleneck analysis is indicated. As a result of the bottleneck analysis, display screen U100 shows that a value of output element SV2-CPU exceeds a limit value when the input element to a system among elements of performance information is the value 600/sec. Display screen U100 displays a list of the elements at that time in descending order of the utilization rate. Moreover, display screen U100 indicates a graph showing a relation between the value of the input element to the system and element SV2-CPU selected on the displayed list. This graph indicates predicted values of output element SV2-CPU and points which indicate detected values of element SV2-CPU versus the input element to the system.

Display screen U100 (a bottleneck analysis screen) shown on the display unit includes analysis result display portion U110 which indicates a bottleneck analysis result. Analysis result display portion U110 may indicate an element (an abbreviation character or symbol that identifies a performance item and a device name) with the highest rate of utilization, a rate of utilization of the element and a value of the input element and the like.

Display screen U100 further includes element list display portion U120 which lists elements in order of a rate of utilization from highest to lowest. Element list display portion U120 may indicate an element of performance information (a performance item), a rate of utilization of the element, and other information and the like.

Display screen U100 also includes graph display portion U130 that indicates a graph about an element selected on the element list of element list display portion U120. Graph display portion U130 may indicate a predicted value of an element calculated using the transform function, points which indicate detected values of the element and a line of 100%.

Display screen U100 further includes first display operation portion U142 indicating detailed information on a correlation model, second display operation portion U144 indicating detailed information on resource information and third display operation portion U146 terminating displaying the bottleneck analysis screen.

By using such a user interface, an administrator can correctly analyze where a bottleneck is.

(Processing Procedure)

(The Overall Processing Procedure)

Next, processing of each unit in an operations management apparatus including the above-mentioned configurations may be also realized as a method, and thus various processing procedures will be described as a data processing method with reference to FIGS. 11-14.

Figure 11:
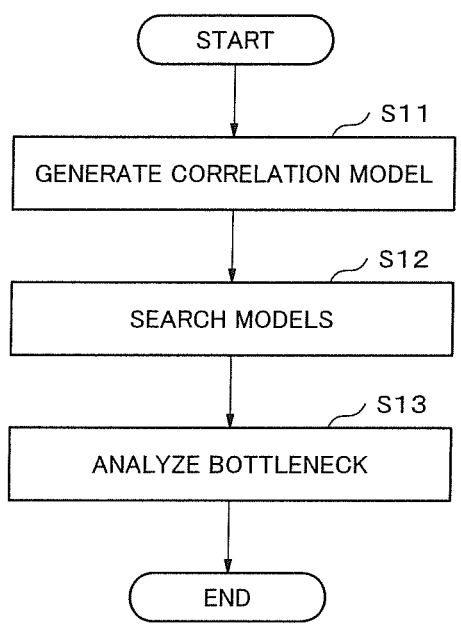
FIG. 11 is an exemplary flowchart of the overall processing procedure in an operations management apparatus of the first exemplary embodiment.

FIG. 11 is an exemplary flowchart of the overall processing procedure of an operations management apparatus of the first exemplary embodiment.

A data processing method according to the first exemplary embodiment performs information processing which manages the operation of a plurality of controlled units based on performance information for each of a plurality of performance items from the plurality of controlled units of a system.

When the performance items or the controlled units mentioned above are designated as elements of performance information, this data processing method may include, as basic configuration, steps of: obtaining a correlation model for each element pair of the performance information by deriving, when the performance items or the controlled units are designated as an element of the performance information, a correlation function between a first series of performance information that indicates time series variation about a first element and a second series of the performance information that indicates time series variation about a second element and by generating the correlation model between the first element and the second element based on the correlation function (Step S11 shown in FIG. 11, for example); and predicting, by searching for the correlation model for each element between an input element and an output element among elements of the performance information in series, a value of the output element from a value of the input element based on the searched correlation model. (Step S12 shown in FIG. 11, for example).

Further, in this data processing method, a step of generating, based on resource information which specifies a range of a value of an element of the performance information, when a predicted value of the output element predicted by prediction of a value of the output element exceeds the range, a bottleneck analysis result including the output element and the value of the output element (Step S13 shown in FIG. 11, for example) may be included.

Hereinafter, detailed processing of the correlation model generation, the model search and the bottleneck analysis will be described.

(Detailed Processing of Correlation Model Generation)

FIG. 12 is an exemplary flowchart of the detailed processing procedure of the correlation model generation in an operations management apparatus of the first exemplary embodiment.

In the detailed processing of the correlation model generation in the first exemplary embodiment, first, information collection unit 122 collects an operation state of service executor 121 and accumulates performance information 12a shown in FIG. 3 in performance information storage processing unit 112.

Correlation model generation unit 123 reads performance information 12a from performance information storage processing unit 112 (Step S101 shown in FIG. 12).

Next, correlation model generation unit 123 determines presence or absence of an element of performance information which has not been analyzed yet (Step S102).

In a state that a correlation model is not generated, correlation model generation unit 123 moves to processing to calculate a transform function between elements of the performance information (Step S103), because there are elements of the performance information which have not been analyzed yet.

First, correlation model generation unit 123 calculates a transform function between a series of element SV1-CPU and a series of SV1-MEM of performance information 12a. In case of FIG. 7, correlation model generation unit 123 determines transform function G300 where SV1-CPU is set as input x and SV1-MEM as output y following system identification processing G301.

There are several techniques in such system identification. For example, using the formula $y=Ax(t)+Bx(t-1)+Cx(t-2)+Dy(t-1)+Ey(t-2)+F$, a value of variables A-F is determined so that values of time series of y calculated from x become closest to values of y detected actually.

Hereinafter, in order to simplify a description, a case where A and B of the formula $y=Ax+B$ are determined will be described. Even when other system identification methods are used, if a transform function that can calculate from a series of individual performance information of one element of performance information a series of individual performance information of another element of performance information is used, the similar effect is obtained.

In System identification processing G301 of FIG. 7, $y=Ax+B$ is selected as a function, and −0.6 and 100 are determined as a value of A and B respectively which can approximate graph G102 from graph G101 (Step S103 shown in FIG. 12).

As shown in graph G302, in system identification processing G301, a series of predicted values of SV1-MEM calculated using this transform function and a series of values of SV1-MEM detected actually (graph G102) are compared. System identification processing G301 then calculates a weight of the transform function from a difference between them (a conversion error) (Step S104 shown in FIG. 12) <that is, a weight calculation step or a weight calculation function>.

Correlation model generation unit 123 adds the calculated transform function and the weight to correlation models of correlation model information storage processing unit 116 (Step S105).

FIG. 8 is an example of a correlation model added in this way. As a correlation model between element SV1-CPU and SV1-MEM, the values of A, B and W are accumulated.

Subsequently, in the same way, by performing processing of Steps S103-S105 to all combinations of a sequence of each element included in performance information 12a, correlation models about current performance information of the system are established in correlation model storage processing unit 116.

(Detailed Processing of Model Search)

Next, detailed processing of the model search in the first exemplary embodiment will be described with reference to FIG. 5, FIG. 13 and FIG. 9. FIG. 13 is an exemplary flowchart of the detailed processing procedure of the model search in an operations management apparatus of the first exemplary embodiment.

Model searching unit 124 receives a value of one element of performance information from bottleneck analysis unit 125 (Step S201) and reads a correlation model from correlation model information storage processing unit 116 (Step S202).

First, model searching unit 124 determines presence or absence of a correlation which has not been searched yet (Step S203). In the initial state, since a predicted value of performance information is in the state not calculated at all, and thus there are correlations not searched yet, model searching unit 124 shifts to processing (Step S204) to calculate a value of another element.

Model searching unit 124 calculates a value of another element using a transform function from the received value of the one element, and records the weight of the transform function used for the calculation (Step S204).

Next, model searching unit 124 determines presence or absence of a value that has been already calculated last time for the element for which calculation has been performed newly (Step S205). In the first calculation, because there are no such already-calculated values, the processing returns to the step (Step S203) to search a correlation which has not been searched yet.

Because the value of the element received from bottleneck analysis unit 125 at the beginning is determined, model searching unit 124 selects one of values of elements with its value already calculated other than the received element, and calculates a value of another element based on this one of values that has been already calculated. Model searching unit 124 calculates a value and a weight of the element which is the target of the calculation from the selected one of values of elements that have been already calculated using a transform function (Step S204).

Model searching unit 124 determines presence or absence of the value that has been already calculated last time for the element for which calculation is made newly (Step S205). When there is a value that has been already calculated last time, model searching unit 124 compares the weights of the last computed value of the element of performance information and this computed value, and selects a value according to the weights (Step S206).

As shown in FIG. 9, supposing y and z have been calculated from x last time, the computed value of y has the weight 0.7 that the transform function of $y=2x$ has. Similarly, the computed value of z has the weight 0.8 that the transform function of $z=3.9x$ has. When z is calculated from y, model searching unit 124 obtains the weight of 0.63 by multiplying the weight 0.9 which the transform function of z=2y has by the weight 0.7 that the value of y has. Because the weight 0.8 of the computed value of z last time is larger than this value, model searching unit 124 selects the last-time-computed value of z as the predicted value of z (Step S206) and returns to Step S203.

Thus, model searching unit 124 calculates a value of another element (output element) from a value of one element (input element) of performance information through a plurality of routes, and selects a route with the largest weight. As a result, model searching unit 124 can finally select, from a plurality of routes, a value that has been calculated by a combination of transform functions that can correctly predict a value of an element as the value of the another element (output element).

(Detailed Processing of Bottleneck Analysis)

Figure 14:
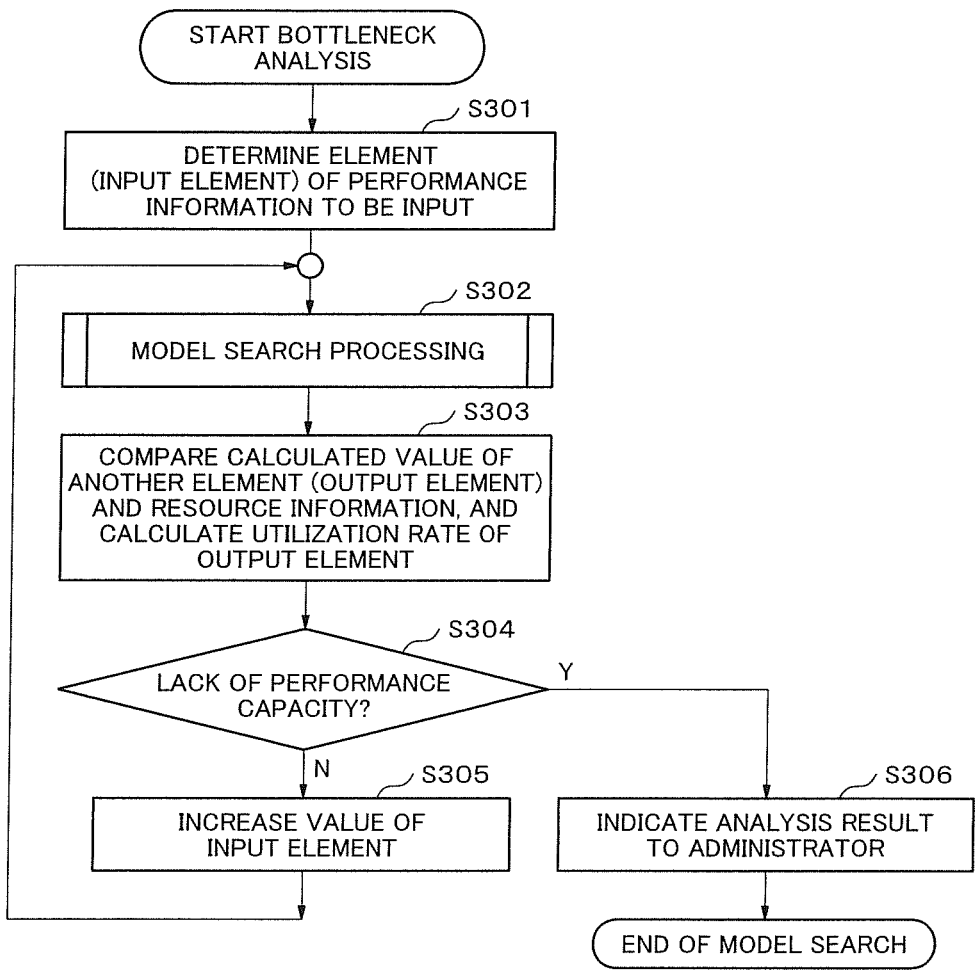
FIG. 14 is an exemplary flowchart of a detailed processing procedure of a bottleneck analysis in an operations management apparatus of the first exemplary embodiment.

Next, detailed processing of the bottleneck analysis in the first exemplary embodiment will be described with reference to FIG. 5, FIG. 14, FIG. 10 and FIG. 15. FIG. 14 is an exemplary flowchart of the detailed processing procedure of the bottleneck analysis in an operations management apparatus of the first exemplary embodiment.

First, as shown in FIG. 14, in the bottleneck analysis, bottleneck analysis unit 125 determines an element (input element) of performance information to be input of a system (Step S301).

For a three-tier system including a WEB, an AP and a DB, for example, an element to be an input includes input traffic or the like to a Web server. A value of the element includes the maximum value or the like detected at present, for example.

Next, bottleneck analysis unit 125 hands a value of the determined element of the performance information to model searching unit 124 and performs model search (Step S302). Model searching unit 124 searches the correlation models and calculates a value of another element (output element) from the value of the input element provided. Next, bottleneck analysis unit 125 receives the calculated value of the another element and compares it with resource information 118*a* accumulated in resource information storage processing unit 118 to calculate the rate of utilization of the another element (Step S303).

For example, when model search in which the current value of SV1-CPU is given as a value of an input element is performed, bottleneck analysis unit 125 compares the value of SV2-CPU calculated as an output element with the minimum and the greatest values of SV2-CPU included in resource information 118*a* of FIG. 10.

Then, bottleneck analysis unit 125 determines whether performance capacity is lacking or not (Step S304).

When being determined that the performance capacity is short at Step S304, bottleneck analysis unit 125 shows the analysis result to an administrator (Step S306).

On the other hand, when being determined that the performance capacity is not lacking at Step S304, bottleneck analysis unit 125 increases the value of the input element in sequence (Step S305) and repeats processing after Step S302.

For example, in Step S304, when the computed value of SV2-CPU is in the range of the minimum and the greatest values specified in resource information 118*a*, bottleneck analysis unit 125 determines that the performance capacity is not lacking, and performs model search again increasing certain quantity of the value of SV1-CPU (Step S305).

In the same way, bottleneck analysis unit 125 performs model search, increasing the value of the input element in sequence, and when one of the calculated values of the element exceeds the specified range in resource information 118*a*, determines that the performance capacity is lacking and indicates the analysis result to an administrator (Step S306).

FIG. 15 is a screen which is shown to an administrator as a result of the bottleneck analysis. Display screen U100 includes output element SV2-CPU which is short of the performance capacity and the value 600/sec of the input element as of that moment.

As a result, administrator can learn that service executor 121 of the current state cannot endure the situation where the input element is beyond 600/sec, and that if any more load is expected, setting changes and equipment reinforcement is needed so that the processing capacity of SV2 will be improved.

Here, in generation of the correlation model, a weight of the correlation model between each of the elements may be calculated based on an error of a value of a second element predicted from a value of a first element using a correlation function and a value of the second element acquired. In this case, in a prediction of a value of the output element, when different values can be predicted depending on a plurality of correlation models for the output element, one value of the output element may be determined based on the weight.

In generation of the bottleneck analysis result, elements sequenced by a rate of utilization may be included in the bottleneck analysis result.

Further, in generation of the bottleneck analysis result, the input element and the value of the input element at the moment when a value of the output element exceeds the range may be included in the bottleneck analysis result.

In generation of the correlation model, a first weight of the correlation model between the first element and the second element, a second weight of the correlation model between the first element and a third element and a third weight of the correlation model between the third element and the second element may be calculated respectively. In this case, it is possible to compare an aggregated weight of the second weight and the third weight to the first weight to predict a value of the output element.

According to the first exemplary embodiment, correlation model generation unit generates correlation models of the overall operating state of a system using a transform function between each element of performance information as described above. When a value of one element (input element) is supposed, a model searching unit calculates a value of another element (output element) by tracing transform functions in the correlation models in sequence. A bottleneck analysis unit increases or decreases a value of one input element in sequence to detect an output element for which a value calculated by a model searching unit is beyond a limit, and generates an analysis result including the output element and the value of the input element as of that moment.

As a result, by generating correlation models of performance information automatically from detected performance information to perform a bottleneck analysis, the first exemplary embodiment possesses the effect that a bottleneck of service executor 121 can be analyzed comprehensively. In the first exemplary embodiment, a value of an element can be predicted more correctly using a plurality of routes in all correlation models based on a correlation between elements of performance information detected by actual practical use. Accordingly, the first exemplary embodiment possesses the effect that there is no need to depend on administrator's experience for verification of an analysis result. Because a correlation model generated includes a transform function that converts between elements of performance information in 1 to 1, one element of performance information can be derived from another element of performance information easily. Accordingly, even if a system is magnified, the first exemplary embodiment possesses the effect that there is no possibility that the amount of processing becomes enormous.

As a result of the bottleneck analysis, an operations management apparatus of the first exemplary embodiment indicates an output element which is beyond a limit of the performance and the input element as of that moment. Thus, an operations management apparatus of the first exemplary embodiment can show to an administrator clearly that attention to which part of a system is required in terms of performance by presenting both information of the value of maximum performance of the system and information which part will be a bottleneck then. An operations management apparatus of the first exemplary embodiment can make clear that which element of a system should be reinforced to cope with an assumed future load.

Thus, in contrast with related technology where only a partial or a doubtful analysis can be realized depending on administrator's experience and sense, the first exemplary embodiment possesses the effect that a bottleneck analysis can be realized automatically without depending on the ability of an administrator, comprehensively over the entire system without increasing a load, and correctly based on an actual system operating status.

In the first exemplary embodiment, one predicted value is selected from a plurality of predicted values of an element based on a weight. However, a predicted value of an element may be calculated by carrying out a predetermined operation to the calculation result of a value of each element based on a weight. A predicted value of an element may be found by performing pruning of a route of a correlation model based on a weight. Even when a different procedure is used, if a value of another element is calculated by searching a correlation model from a value of one element, the similar effect will be obtained.

In one of related technologies, a model is generated for a temporal change in one element of performance information, and a predicted value of the element when time has passed is calculated. Also in another related technology, a coefficient of correlation between two elements of performance information is used. However, it cannot be used for a prediction (bottleneck analysis) of a value of an element, because the coefficient of correlation is not a transform function. Although the coefficient of correlation can support malfunction detection, it cannot be used for analyzing a bottleneck, because even if one value is found the other cannot be calculated.

In contrast, an operations management apparatus of the first exemplary embodiment generates a model using a transform function between elements of performance information. A correct value of an element of performance information can be predicted for each element configuring a system, because an operations management apparatus of the first exemplary embodiment can calculate a value of another element when a value of one of performance information increases. Consequently, analysis of an element which will be a bottleneck can be done correctly.

Thus, in an operations management apparatus of the first exemplary embodiment, a correlation model of performance information is generated automatically from detected performance information to perform a bottleneck analysis. Accordingly, the first exemplary embodiment possesses the effect that a bottleneck can be analyzed according to situations during operation including conditions failed to be assumed at the time of a test. The first exemplary embodiment also possesses the effect that it can analyze not only specific processing assumed in advance but also all service executors' behavior comprehensively.

Furthermore, verification of an analysis result does not need to depend on administrator's experience, because an operations management apparatus of the first exemplary embodiment can extract a bottleneck with a high possibility to occur in a targeted system in the future based on a correlation between elements of performance information detected by actual practical use. In an operations management apparatus of the first exemplary embodiment, a value of another element can be derived from a value of one element of performance information easily, because a generated correlation model includes a transform function that converts between elements of performance information in 1 to 1. Accordingly, even if a system is magnified, an operations management apparatus of the first exemplary embodiment can analyze a bottleneck without the amount of processing becoming enormous.

Thus, the first exemplary embodiment possesses the effect that a bottleneck which may occur in an actual operational situation can be predicted correctly, because modeling is performed by extracting a correlation of detected performance information appropriately. The first exemplary embodiment possesses the effect that it can realize a bottleneck analysis in which administrator's burden is low and which does not increase a processing load that is also needed for an analysis in the large-scale environment.

In an operations management apparatus of the first exemplary embodiment, correlation model generation unit generates a weight that indicates correctness of each transform function, and when different values are calculated depending on a plurality of transform functions to one element of performance information, a model searching unit calculates one value based on the weight. As a result, the first exemplary embodiment has the effect that it can analyze a bottleneck more correctly, because a value of an element of performance information can be calculated more correctly using a plurality of routes in all correlation models.

Further, in an operations management apparatus of the first exemplary embodiment, an administrator dialogue unit shows an output element which is beyond the limit of the performance and the input element as of that moment as an analysis result of a bottleneck analysis unit. Thus, the first exemplary embodiment possesses the effect that it can make clear which element of a system should be reinforced to cope with an assumed future load, by presenting both information of the value of maximum performance of the system and information which part will be a bottleneck then.

In an operations management apparatus of the first exemplary embodiment, an administrator dialogue unit indicates an output element which is beyond the limit of the performance as well as the other elements in the order corresponding to the rate of utilization. As a result, the first exemplary embodiment possesses the effect that it can show to an administrator clearly that attention to which part of a system including the other elements of performance information is required in terms of performance.

Here, by a computer executing various programs stored in a suitable memory, some of blocks in the block diagram shown in FIG. 5 (such as blocks indicated by the symbols 123, 124, 125, 121, 122, 126, 127 and 128, for example) may be a software module which indicates a state functionalized by the program.

That is, although the physical composition of the first exemplary embodiment is of one or more CPUs (or, one or more CPUs and one or more memories) or the like, for example, software structure by each unit (circuit and means)

expresses a plurality of functions that CPU exhibits under control of a program as a component by a plurality of units (means) respectively.

When a dynamic state where the CPU is operated by a program (a state where each procedure configuring the program is being executed) is expressed functionally, it can be considered that each part (means) is structured inside the CPU. In a static state where the program is not being executed, an entire program for enabling structuring of each means (or each program part included in the structure of each means) are stored in a storage area such as a memory.

It is naturally understood that the explanations of each unit (means) provided above is understood as describing a computer functionalized by programs along with the functions of the programs, or as describing an apparatus includes a plurality of electronic circuit blocks that are functionalized permanently with specific hardware. Therefore, those functional blocks can be achieved in various kinds of forms such as only with hardware, only with software, or combination of those, and it is not intended to be limited to any one of those.

Each unit may be configured as a device including a dedicated computer which can communicate, and an operations management system may be configured by these devices.

[Second Exemplary Embodiment]

Figure 16:
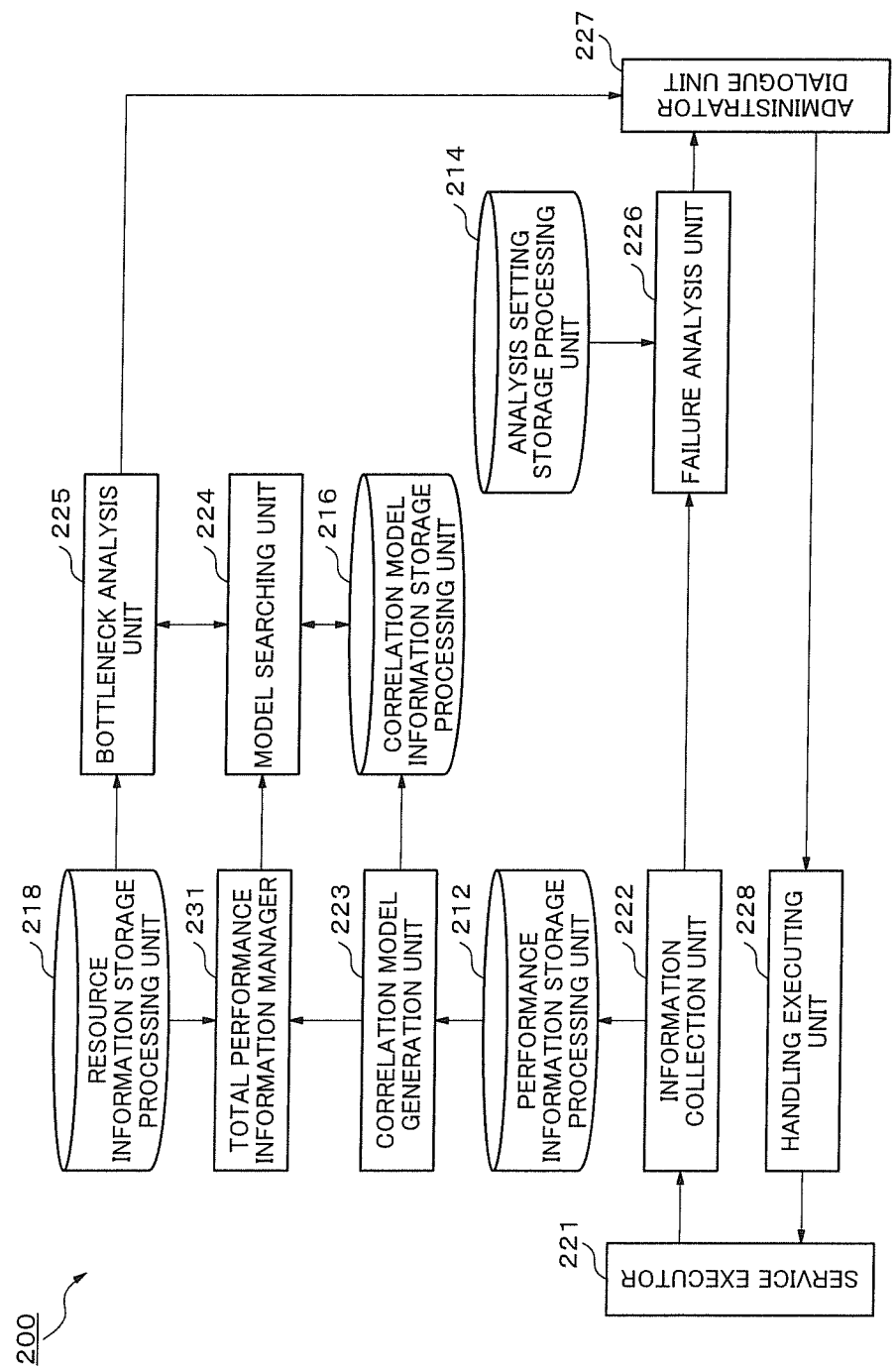
FIG. 16 is an exemplary block diagram of the entire structure of an operations management apparatus of a second exemplary embodiment.

Next, a second exemplary embodiment will be described based on FIG. 16, FIG. 17, FIG. 18, FIG. 19, FIG. 20 and FIG. 21. In the following description, description of a substantially similar configuration to the first exemplary embodiment will be omitted, and only different parts are stated. FIG. 16 is an exemplary block diagram of the entire structure of an operations management apparatus in the second exemplary embodiment.

A configuration in second exemplary embodiment includes total performance information manager 231 in addition to the configuration described using FIG. 5 of the first exemplary embodiment.

As shown in FIG. 16, operations management apparatus 200 of second exemplary embodiment includes total performance information manager 231 in addition to service executor 221, performance information storage processing unit 212, information collection unit 222, analysis setting storage processing unit 214, failure analysis unit 226, administrator dialogue unit 227, handling executing unit 228, correlation model generation unit 223, correlation model information storage processing unit 216, model searching unit 224, resource information storage processing unit 218 and bottleneck analysis unit 225 which are the same compositions as in the first exemplary embodiment.

Resource information storage processing unit 218 accumulates total performance information calculated from a plurality of elements of performance information and group information which designates a combination of a plurality of target elements of the calculation in addition to information described in FIG. 5.

Total performance information manager 231 receives the group information from resource information storage processing unit 218 and instructs correlation model generation unit 223 to generate total performance information. Total performance information manager 231 directs model searching unit 224 to update the value of total performance information.

Correlation model generation unit 223 generates total performance information which takes time series of values calculated by applying a predetermined arithmetic operation to the value of a plurality of elements of performance information detected simultaneously according to a direction of total performance information manager 231 as a value of an element in addition to the function of the first exemplary embodiment. Correlation model generation unit 223 adds this total performance information to the performance information to generate a correlation model.

When a value of an element of performance information is predicted, model searching unit 224 recalculates the value of total performance information following directions from total performance information manager 231 (total performance information re-calculation function) in addition to the function of the first exemplary embodiment.

Figure 17:
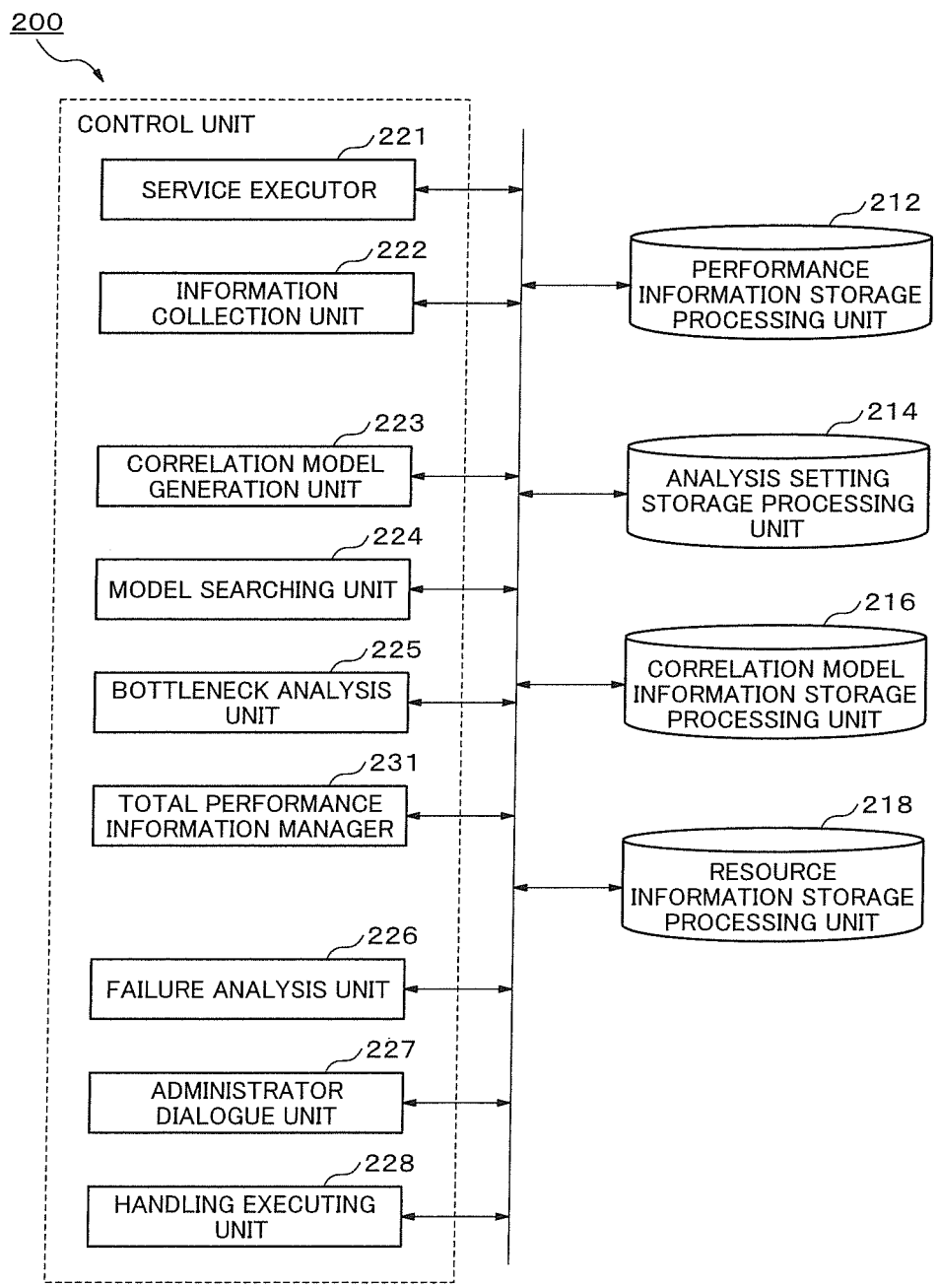
FIG. 17 is another exemplary block diagram of the entire structure of an operations management apparatus of the second exemplary embodiment.

FIG. 17 is another exemplary block diagram of the entire structure of an operations management apparatus of the second exemplary embodiment. As shown in FIG. 17, each unit of operations management apparatus 200 may include a plurality of functions of a control unit.

Total performance information manager 231 may group elements and calculate the total value of the elements which are grouped. In this case, correlation model generation unit 223 may add a grouped element which includes the above mentioned total value to the performance information as a new element, and generate a correlation model from a correlation between one of the new elements and another of the new elements.

Figure 18:
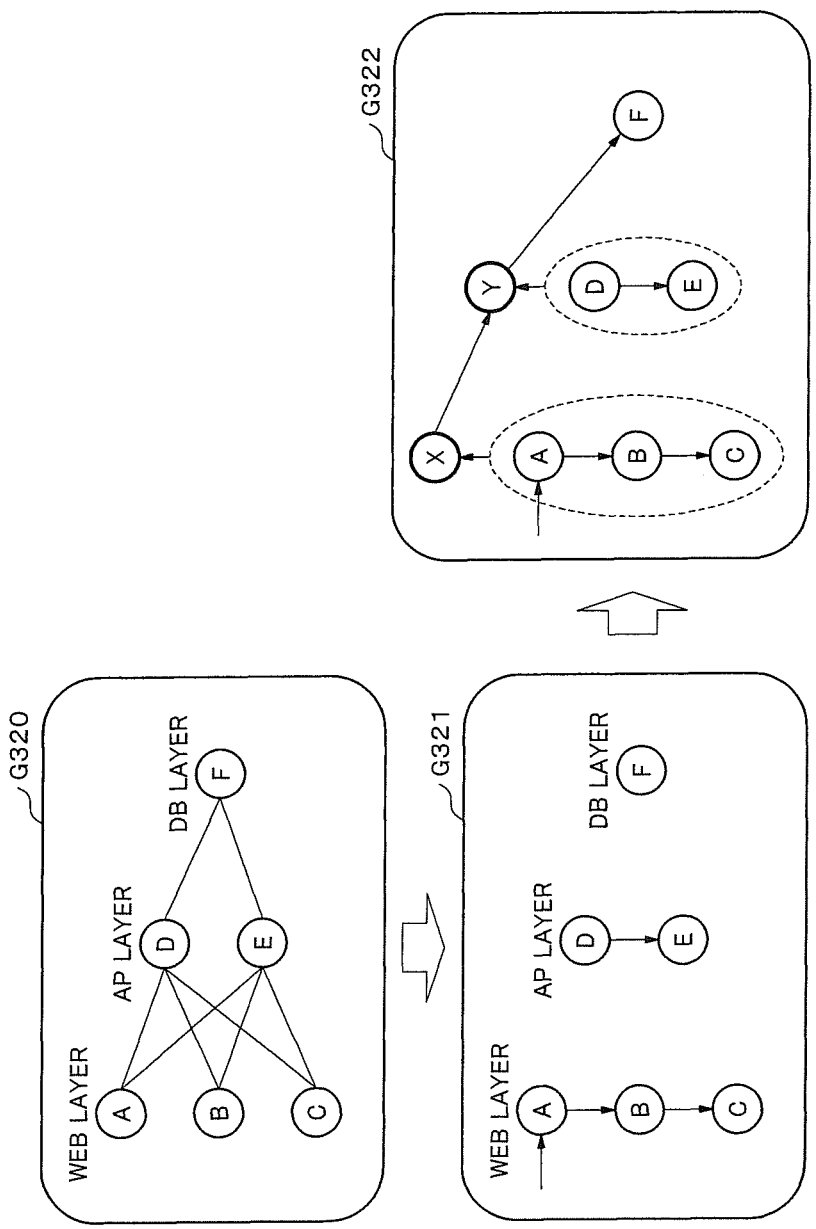
FIG. 18 is an exemplary diagram of total performance information generation in an operations management apparatus of the second exemplary embodiment.

In operations management apparatus 200, the outline of correlation model generation using total performance information will be described. FIG. 18 is an exemplary diagram of total performance information generation in an operations management apparatus of the second exemplary embodiment.

As shown in FIG. 18, configuration graph G320 indicates the composition of a load distribution system including three layers of WEB layer, AP layer and DB layer. The load of WEB layer is shared by three servers, and the load of AP layer is shared by two servers. Elements A-C of performance information indicate the performance of each server for WEB layer, and similarly, elements D-E and element F indicate performance for AP layer and DB layer, respectively.

Correlation graph G321 is an example of a correlation model generated by operation described in the first exemplary embodiment. In this example, a correct correlation has been generated at each layer where same processing is dispersed to be carried out, while a significant correlation has not been generated between the layers.

Correlation graph G322 is an example of a correlation model generated using total performance information of the second exemplary embodiment. In this example, as total performance information, an element X with the sum of the values of the elements of WEB layer and an element Y with the sum of the values of the elements of AP layer are generated respectively. As a result, a correct correlation is generated between the layers.

Thus, a correlation between each layer is generated by using total performance information.

Next, a data structure of resource information 118b of resource information storage processing unit 218 which accumulates total performance information will be described. FIG. 19 is an exemplary diagram of a data structure of resource information in an operations management apparatus of the second exemplary embodiment.

A new attribute, Group, is added to the resource information 118b in addition to the information on resource information 118a shown in FIG. 10.

As group information, elements required for calculation of total performance information is enumerated for elements X and Y of total performance information.

For example, element X of total performance information has elements A, B and C of WEB layer indicated in configuration graph G320 of FIG. 18 as group information. Also, element Y of total performance information has elements D and E of performance information of AP layer indicated in configuration graph G320 of FIG. 18 as group information. Group information is not described for elements other than the elements of total performance information.

By providing an item of group information in resource information 118a, and by grouping the value of each element, operations management apparatus 200 manages total performance information.

(Processing Procedure)

Next, processing of each unit in an operations management apparatus including the above-mentioned configurations will be also realized as a method, and thus various processing procedures will be described as a data processing method with reference to FIGS. 20 and 21.

(Detailed Processing of Correlation Model Generation)

Figure 20:
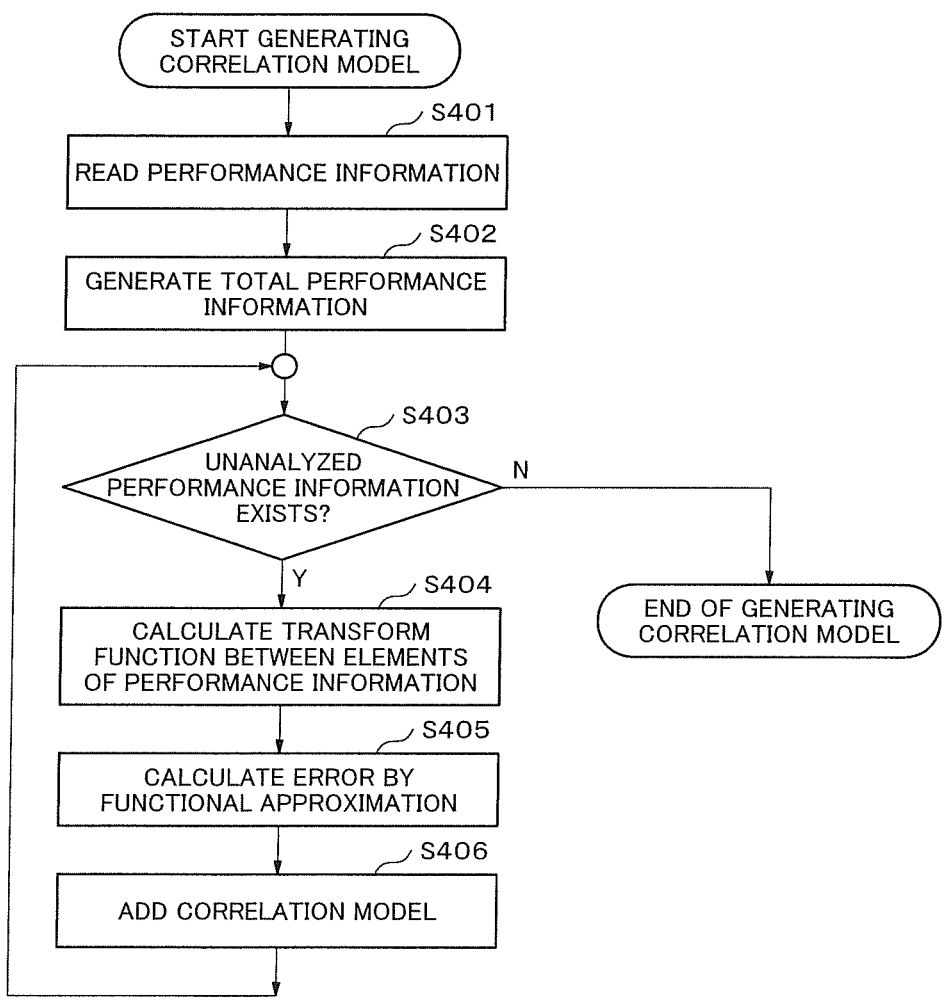
FIG. 20 is an exemplary flowchart of a detailed processing procedure of correlation model generation in an operations management apparatus of the second exemplary embodiment.

FIG. 20 is an exemplary flowchart of the detailed processing procedure of correlation model generation in an operations management apparatus of the second exemplary embodiment.

In FIG. 20, Step S402 which generates total performance information is added in addition to Steps S401 and S403-S406 which are the same steps as Steps S101-S105 described using FIG. 12 in the first exemplary embodiment.

The detailed processing of the correlation model generation in the second exemplary embodiment is similar to one described in the first exemplary embodiment, but different in a point that Step S402 which generates total performance information is performed following Step S401 which reads performance information.

Referring to FIG. 20, correlation model generation unit 223 reads performance information from performance information storage processing unit 212 (Step 401) and generates total performance information according to a direction of total performance information manager 231 (Step 402).

In this case, total performance information manager 231 reads resource information 118b from resource information storage processing unit 218, searches elements X and Y of total performance information for which group information is designated, and directs correlation model generation unit 223 to calculate the value of these elements X and Y.

Correlation model generation unit 223 adds values of elements A, B and C of performance information at the same clock time following the direction and generates time series of values of element X.

Similarly, time series of element Y is generated from elements D and E.

Henceforth, correlation model generation unit 223 adds elements X and Y of total performance information to the elements accumulated in performance information storage processing unit 212 and generates a correlation model. As described in the first exemplary embodiment, correlation model generation unit 223 repeats generation of a transform function (Step 404), calculation of an error (Step 405) and addition of a correlation model (Step 406) until there is no performance information which has not been analyzed (Step 403).

FIG. 18 is an example of a correlation model generated in this way.

As shown in FIG. 18, configuration graph G320 shows a system with a 3 layer composition of WEB, AP and DB which include three servers, two servers and one server, respectively.

When a correlation of performance information on each server is modeled, there may be a case where a correlation between each layer is not generated appropriately, as shown in correlation graph G321. Or, there is a case where although a correlation between each layer can be generated, an error of the correlation model may be very large.

For example, the processing load of DB layer appears only in element F of performance information, while the processing load of AP layer appears being dispersed in elements D and E because the load is shared by the two servers.

Here, when a correlation between element D and element F is considered, the value of the element F depends on the summation of the value of element D and element E. When processing by element D and element E is quite even, the value of the element F is correlated with two times of the value of element D. However, when there is a bias between processing associated with element D and processing associated with element E, the value of element F cannot be identified correctly only from the value of element D.

Similarly, a correlation between element E and element F is weak. The same problem also occurs between WEB layer and AP layer, and a correlation from elements A, B and C to elements D and E is weak. As a result, as shown in correlation graph G321, only a partial correlation is extracted.

Generally, in order to resolve such a problem, a correlation model is generated using a transform function of N vs. 1, not a transform function of 1 to 1 of elements. However, as the number of elements of performance information increases, enormous calculation resources are needed. Further, when a transform function with N inputs and one output is used for generation of a correlation model, the N inputs has to be determined in order to calculate a value of one certain element. Accordingly, it is difficult to perform an analysis such as which part a system will be a bottleneck when one input load of the system increases.

Accordingly, in case of correlation model generation using total performance information according to the second exemplary embodiment, as shown in correlation graph G322, elements X and Y are generated in addition to elements A-F which are detected actually. Element Y is the total of the values of elements D and E of AP layer. By element Y, the system can be handled as if there is one server in AP layer.

As a result, a clear correlation can be generated between the element Y indicating the processing load of whole AP layer and element F indicating the processing load of whole DB layer. In the same way, a correlation can be generated between element X which indicates whole WEB layer and element Y which indicates whole AP layer.

(Detailed Processing of Model Search)

Figure 21:
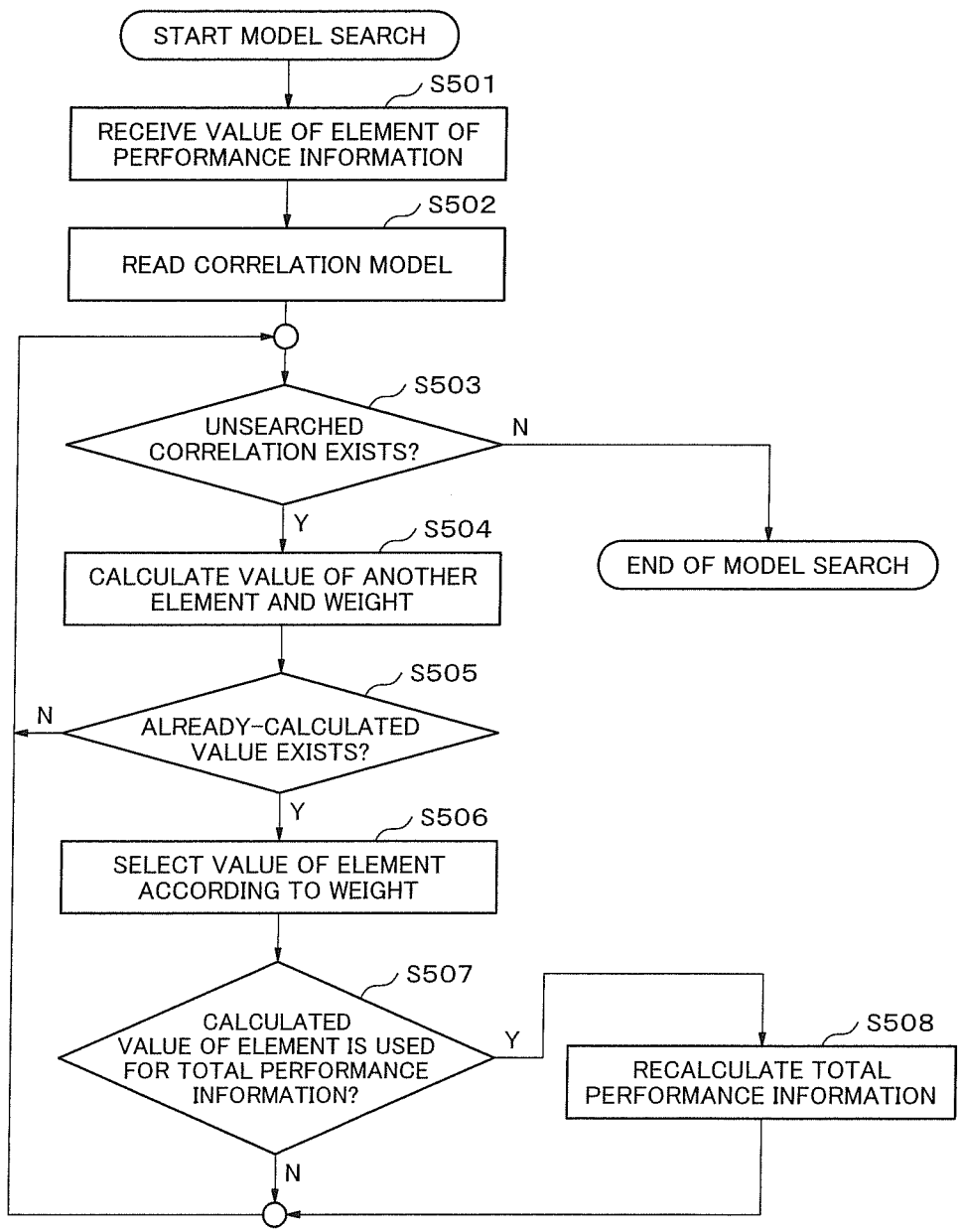
FIG. 21 is an exemplary flowchart of a detailed processing procedure of model search in an operations management apparatus of the second exemplary embodiment.

FIG. 21 is an exemplary flowchart of the detailed processing procedure of model search in an operations management apparatus of the second exemplary embodiment.

In FIG. 21, Step S507 which determines group designation and Step S508 which recalculates total performance information are added in addition to Steps S501-S506 which are the same steps as Steps S201-S206 described using FIG. 13 in the first exemplary embodiment.

Referring to FIG. 21, the operation of model search in the second exemplary embodiment is similar to one described in the first exemplary embodiment, but different in a point that, following Step S506 which determines a value of an element of performance information, Step S507 for determining whether the determined value is used for total performance information and Step S508 which recalculates total performance information are added.

In order to calculate another performance value for a certain input performance value, model searching unit 224 reads a correlation model including total performance information, and performs search (Steps S501-S506). When calculated values of elements are used for calculation of total performance information (Step S507), model searching unit 224 recalculates total performance information using the new values of the elements following directions of total performance information manager 231 (Step S508).

Bottleneck analysis unit 225 identifies the maximum performance of the system and an element which will be a bottleneck by repeating calculation of a value of an element of performance information by such model search.

Referring to FIG. 19, information for bottleneck analysis unit 225 to determine the rate of utilization of total performance information (the unit, the minimum and the maximum of a value of an element of total performance information) are included in resource information 118*b*.

For example, the maximum value of elements A, B and C is 100%. Accordingly, the maximum value of element X of total performance information will be 300% according to the total of the maximum values of elements A, B and C. The maximum value of elements D and E is 1000 Mbps. However, there is a case where a network band may not be obtained by totaling, and thus the maximum value of element Y of total performance information will be 1000 Mbps. Bottleneck analysis unit 225 analyzes which element will be a bottleneck based on this resource information 302.

Here, for example, when element A of FIG. 18 is designated as input element, values of elements B and C can be calculated from the value of element A based on a correlation in the same WEB layer. The value of element X can be calculated from the total of the values of elements A, B and C. The value of element Y and element F can be calculated from element X.

The value of elements D and E in the group of element Y can also be calculated from the value of element Y.

As a result, when a load associated with element A is increasing, a load associated with element F which is a DB server can be calculated correctly.

In generating the correlation model, the elements are grouped, the total value of elements which are grouped is calculated, a grouped element with the total value is added to the performance information as a new element, and a correlation model is generated from a correlation between one of the new elements and another of the new elements.

As mentioned above, according to second exemplary embodiment, correlation model generation unit generates a correlation model including total performance information obtained by performing a predetermined arithmetic operation on a plurality of elements of detected performance information following a direction of total performance information manager 231, while exhibiting the same operation effect as the first exemplary embodiment. Then, model searching unit 224 predicts a value of the performance information using correlation models including total performance information.

As a result, for example, even when a value of one element of performance information is related to the total of the values of a plurality of elements such as in load sharing processing, an operations management apparatus can analyze a bottleneck correctly without increasing the amount of processing. Thus, in comparison with related technology for which the enormous processing load is needed, the second exemplary embodiment possesses the remarkable effect that a correct bottleneck analysis where a correlation with a group including a plurality of elements is also taken into account while suppressing increase of the processing load only to an increase associated with the increased number of the elements of total performance information can be realized in addition to the effect of the first exemplary embodiment.

In second exemplary embodiment, a value of an element of total performance information is the summation of a value of each element which is grouped. However, the value of an element of total performance information may be calculated by carrying out a predetermined operation on a value of each element which is grouped.

In the second exemplary embodiment, although the description has been made in the form that total performance information manager directs calculation of a value of total performance information to a correlation model generation unit and a model searching unit, the embodiment is not limited to this. There may be a form where total performance information manager writes a value of total performance information in a performance information storage processing unit directly. Also there may be a form where total performance information manager adds an attribute that indicates a dependency relationship of a group to a correlation model in a correlation model information storage processing unit, and a model searching unit performs search. Even when a different procedure is used, if new performance information is generated by applying predetermined calculation to detected performance information and is used for searching, the similar effect will be obtained.

Thus, correlation model generation unit generates a correlation model including total performance information obtained by performing a predetermined arithmetic operation on a plurality of elements of detected performance information following directions of total performance information manager. Then, a model searching unit predicts a value of performance information using correlation models including total performance information. As a result, for example, even when a value of one element of performance information is related to the total of the values of a plurality of elements such as in load sharing processing, an operations management apparatus can analyze a bottleneck correctly without increasing the amount of processing.

Other structures, other steps, functions and the operational effects thereof are the same as those of the case of the first exemplary embodiment described above. Further, the content of operation of each step and the structural elements of each unit and functions realized by them described above may be put into a program to be executed by a computer.

[Third Exemplary Embodiment]

Figure 22:
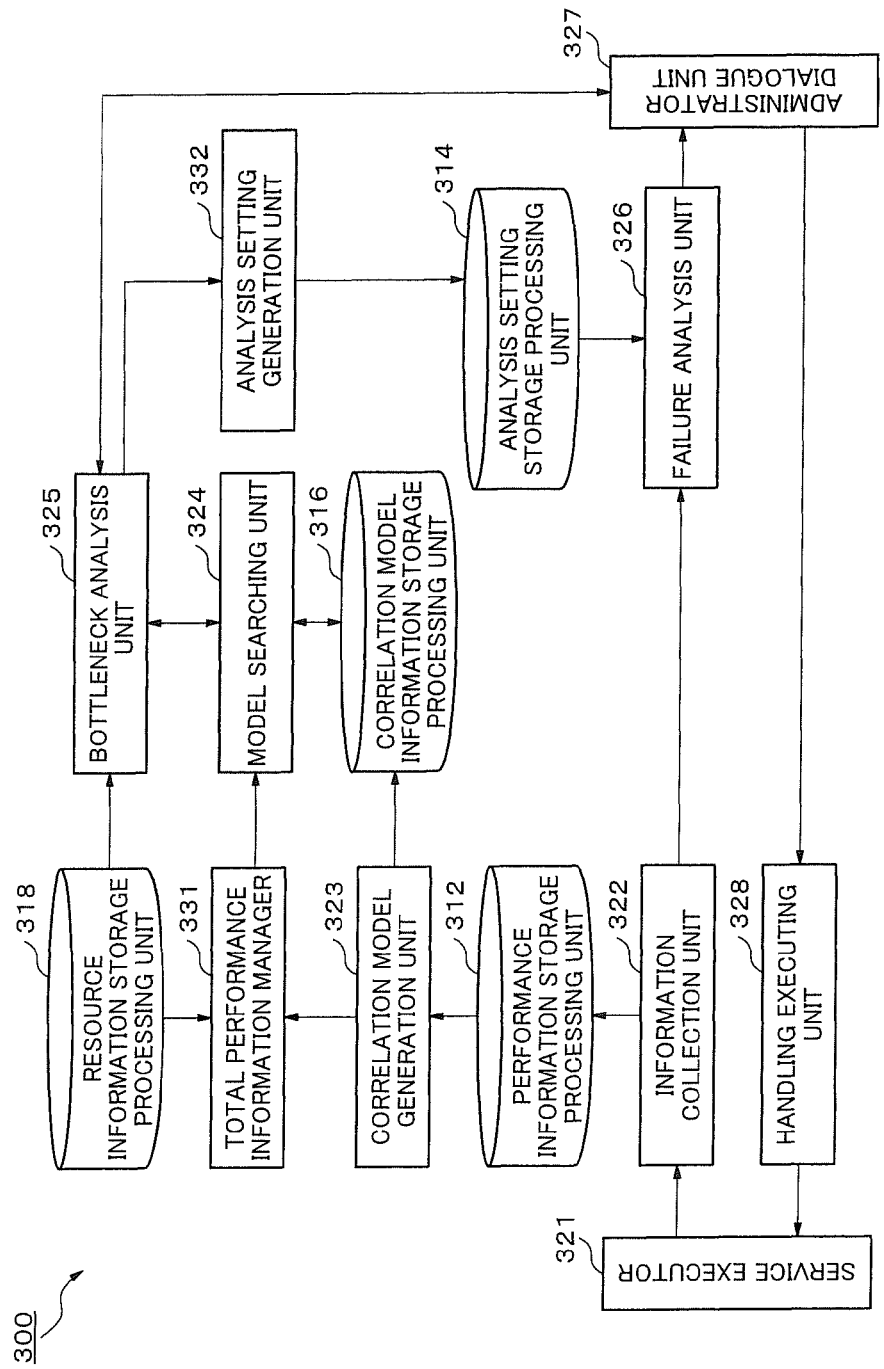
FIG. 22 is an exemplary block diagram of the entire structure of an operations management apparatus of a third exemplary embodiment.

Next, a third exemplary embodiment will be described based on FIG. 22. In the following description, description of a substantially similar configuration to the first exemplary embodiment will be omitted, and only different parts are stated. FIG. 22 is an exemplary block diagram of the entire structure of a operations management apparatus in the third exemplary embodiment.

An operations management apparatus in the third exemplary embodiment includes an analysis setting generation unit in addition to the configuration described using FIG. 13 in the second exemplary embodiment.

As shown in FIG. 22, operations management apparatus 300 of a third exemplary embodiment includes analysis setting generation unit 332 in addition to service executor 321, performance information storage processing unit 312, information collection unit 322, analysis setting storage processing unit 314, failure analysis unit 326, administrator dialogue unit 327, handling executing unit 328, correlation model generation unit 323, correlation model information storage processing unit 316, model searching unit 324, resource information storage processing unit 318, bottleneck analysis unit 325 and total performance information manager 331 which are the same compositions as in the second exemplary embodiment.

Analysis setting generation unit 332 receives a bottleneck analysis result from bottleneck analysis unit 325 and generates an additional setting to monitor and analyze an element of performance information which is expected to be a bottleneck in failure analysis unit 326. Analysis setting generation unit 332 corrects analysis setting accumulated in analysis setting storage processing unit 314 according to this additional setting.

Bottleneck analysis unit 325 receives administrator's input from administrator dialogue unit 327 and instructs analysis setting generation unit 332 to correct setting information.

Figure 23:
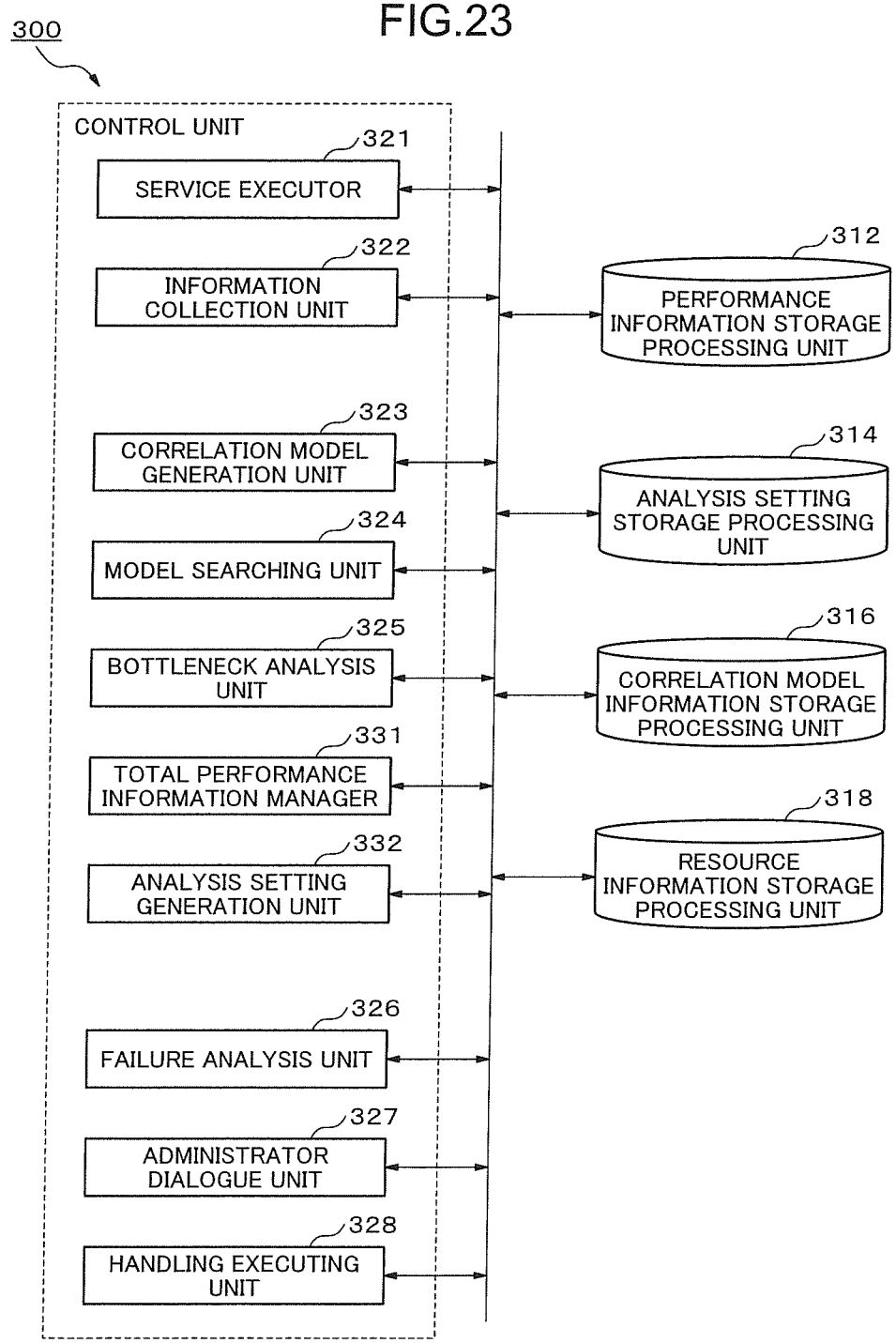
FIG. 23 is another exemplary block diagram of the entire structure of an operations management apparatus of the third exemplary embodiment.

FIG. 23 is another exemplary block diagram of the entire structure of an operations management apparatus of the third exemplary embodiment. Here, as shown in FIG. 23, each unit of operations management apparatus 300 may include a plurality of functions of a control unit.

Analysis setting generation unit 332 may add a monitoring setting in which an output element included in a bottleneck analysis result is the monitoring subject of a failure analysis.

(Processing Procedure)

Next, processing of each unit in an operations management apparatus including the above-mentioned configurations will be also realized as a method, and thus various processing procedures will be described as a data processing method with reference to FIG. 24 to 26.

Figure 24:
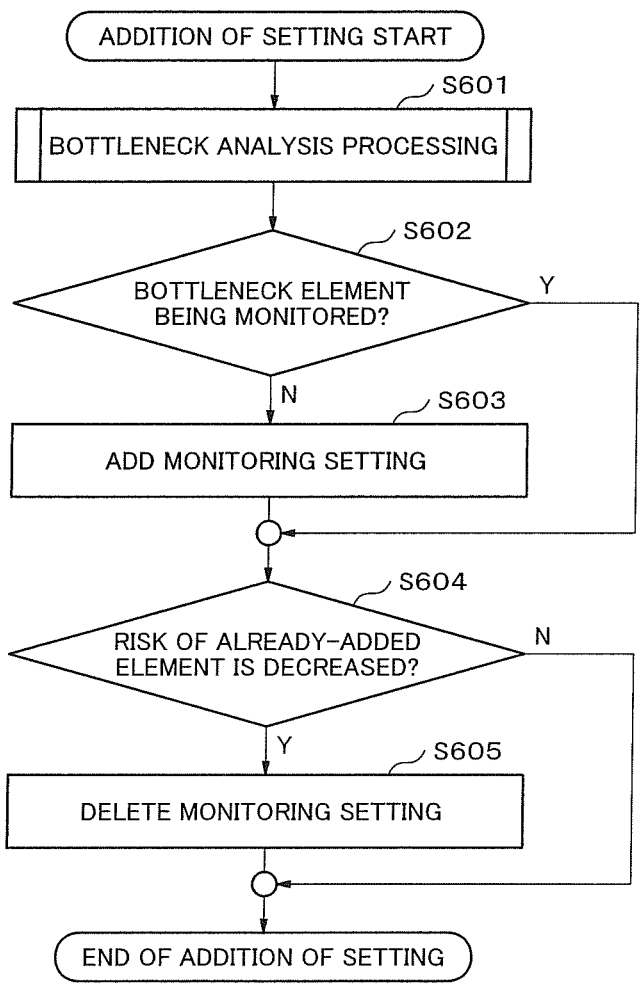
FIG. 24 is an exemplary flowchart of a detailed processing procedure of analysis setting generation in an operations management apparatus of the third exemplary embodiment.

FIG. 24 is an exemplary flowchart of the detailed processing procedure of the analysis setting generation in an operations management apparatus of the third exemplary embodiment.

Figure 25:
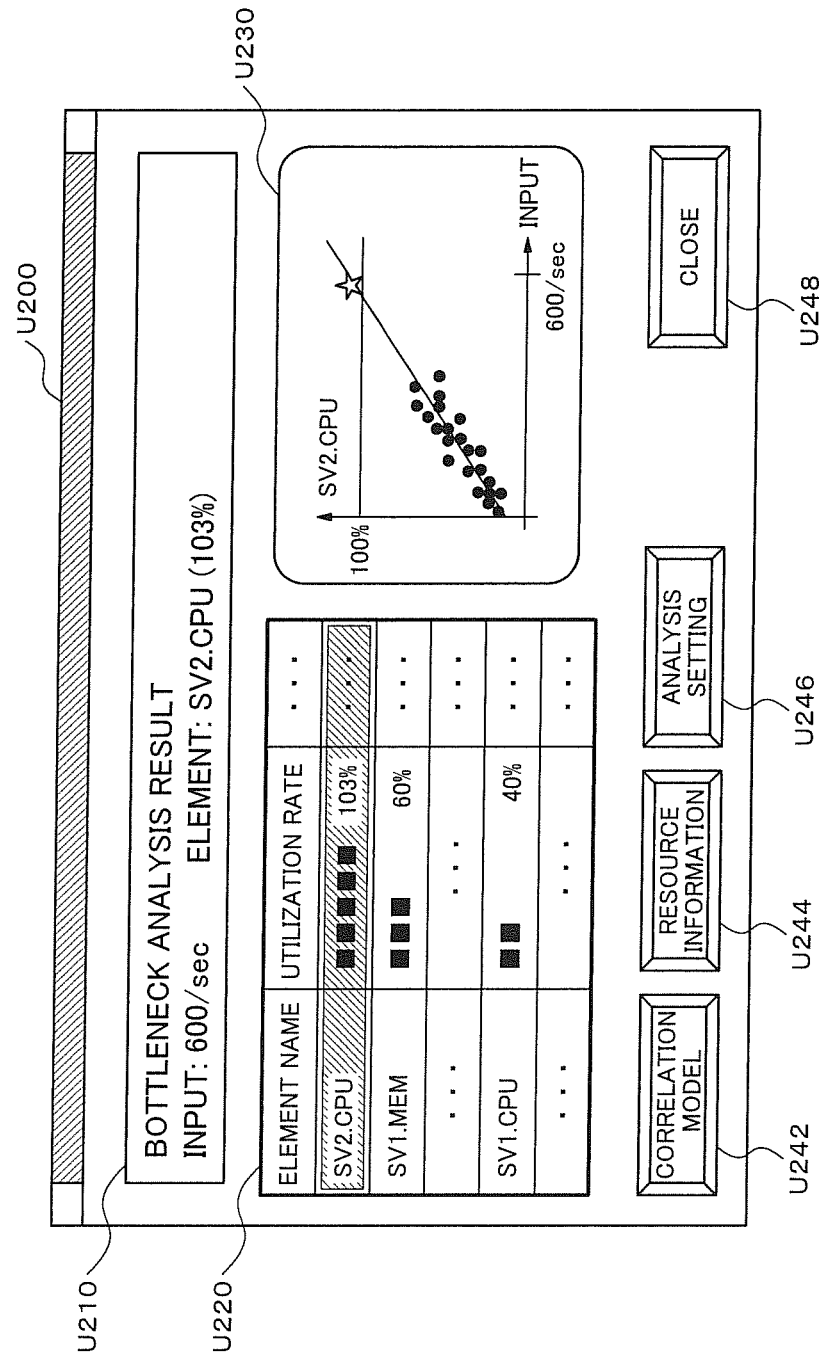
FIG. 25 is an exemplary diagram of an indicated display screen in an operations management apparatus of the third exemplary embodiment.

FIG. 25 is an exemplary diagram of an indicated display screen in an operations management apparatus of the third exemplary embodiment. An operation button of Analysis Setting is added in addition to the display screen described using FIG. 15 in the first exemplary embodiment.

Figure 26:
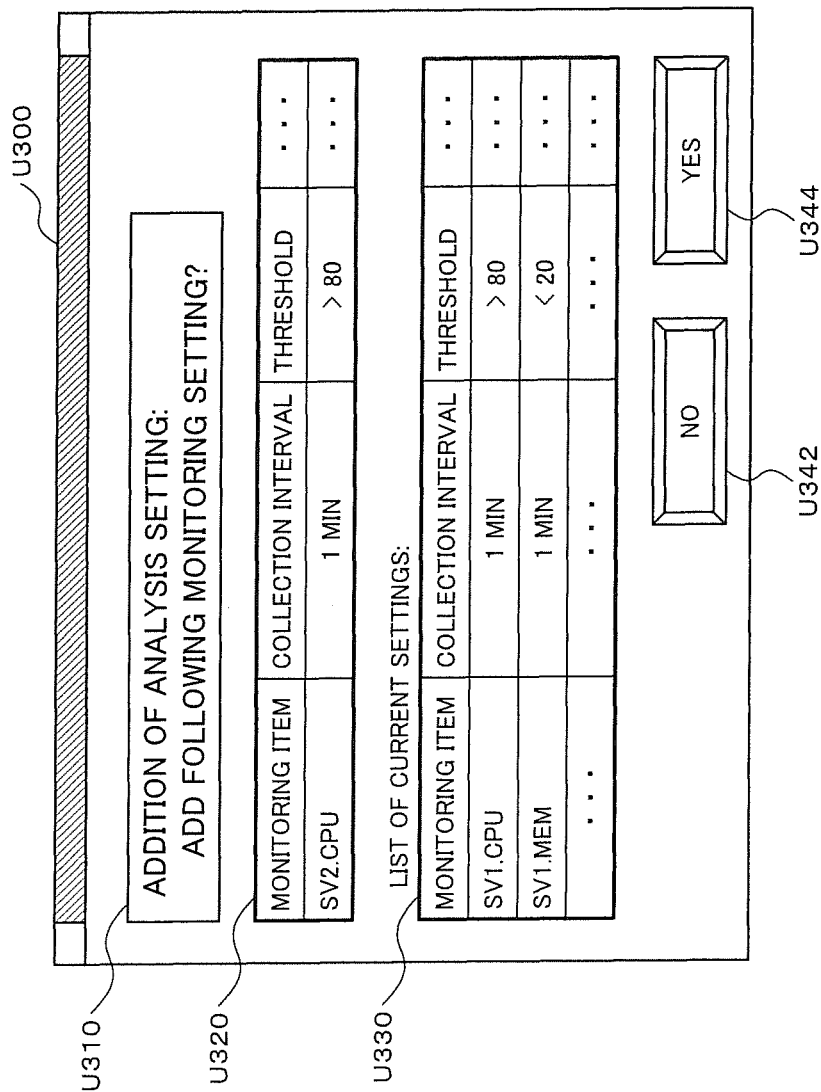
FIG. 26 is another exemplary diagram of an indicated display screen in an operations management apparatus of the third exemplary embodiment.

FIG. 26 is another exemplary diagram of an indicated display screen in an operations management apparatus of the third exemplary embodiment. A display screen of FIG. 26 is called from the operation button of Analysis Setting in FIG. 25, and used for an administrator to check whether a setting change is possible or not.

Referring to FIG. 24, first, bottleneck analysis unit 325 performs bottleneck analysis processing (Step S601). The operation of a bottleneck analysis in the third exemplary embodiment is same as the ones described in the first and second exemplary embodiment.

Analysis setting generation unit 332 receives a result of the bottleneck analysis from bottleneck analysis unit 325, refers to an analysis setting of analysis setting storage processing unit 314, and when an element which is being a bottleneck is not assigned as a target of failure analysis (Step S602), adds a monitoring setting to monitor the element (Step S603).

When an element added to the monitoring settings before is judged to be safe (the risk of the element is decreased) in the current bottleneck analysis result (Step S604), the monitoring setting is deleted (Step S605).

By these Steps S601-S605, it is possible to make the output element included in the bottleneck analysis result a monitoring subject of the failure analysis.

An example of a display screen displayed on a display unit of an operations management apparatus is shown in FIG. 25. This Figure is an example of a display screen in the bottleneck analysis.

In a display screen U200, a fourth display operating portion U246 that is an operation button of Analysis Setting is added in addition to analysis result display portion U210, element list display portion U220, graph display portion U230, a first display operation portion U242 indicating detailed information of a correlation model, second display operation portion U244 indicating detailed information of resource information and third display operation portion U248 terminating displaying the bottleneck analysis screen which are the same configuration as display screen U100 shown in FIG. 15.

Display screen U300 shown in FIG. 26 is indicated by pushing down fourth display operating portion U246.

Display screen U300 (analysis rule setting screen) includes analysis rule display setting portion U320 to set an analysis rule, analysis rule list display portion U330 where analysis rules currently set are list-displayed, message display portion U310 which indicates a message of whether an analysis rule is added or not, and display operation sections U342 and U344 to confirm completion of a setting on the analysis rule setting screen.

Here, an administrator confirms whether an output element included in a bottleneck analysis result is not leaking from monitoring targets and corrects the analysis settings if needed.

As mentioned above, according to the third exemplary embodiment, an analysis setting generation unit generates an additional setting for a failure analysis unit to monitor and analyze an element of performance information which is expected to be a bottleneck, while exhibiting the same operation effect as the first exemplary embodiment. As a result, the third exemplary embodiment has the effect that, for a bottleneck found newly by analyzing a system comprehensively, it is possible to watch the element of the bottleneck continually, and consequently more appropriate operations management can be performed.

Other structures, other steps, and the operational effects thereof are the same as those of the case of the first exemplary embodiment described above. Further, the content of operation of each step and the structural elements of each unit and functions realized by them described above may be put into a program to be executed by a computer.

[Other Various Modifications]

Although the device and method according to the present invention have been described according to specific exemplary embodiments, it is possible to modify the exemplary embodiments described in various ways without departing from the scope of the present invention.

For example, the number, position and shape or the like of the above-mentioned constructional elements are not limited to the above-mentioned exemplary embodiments, and the number, a position and a shape or the like which are suitable when the present invention is implemented can be selected. That is, in the above-mentioned exemplary embodiments, although elements of performance information are grouped in WEB layer, AP layer and DB layer when total performance information is calculated, the present invention does not limit the number of layers thereof. An element of performance information may be grouped according to other various classifications.

The operation control managing software according to the present invention may be installed in one PC, or it may be installed in a configuration which can be used by a terminal and a server in a client/server system or in P2P environment. Further, the various display screens may have a configuration accessible on the web.

In an operations management apparatus according to an aspect of the exemplary embodiment including a service executor which provides an information and communications service such as a WEB service and a business service, a performance information storage processing unit which accumulates each element of performance information of the service executor, an information collection unit which detects and outputs an operation state of the service executor and accumulates the performance information included in the operation state in the performance information storage processing unit, an analysis setting storage processing unit which accumulates an analysis setting to detect abnormality of the service executor, a failure analysis unit which receives the operation state from the information collection unit and performs a failure analysis according to a analysis setting of the analysis setting storage processing unit, an administrator dialogue unit which receives a result of the failure analysis from the failure analysis unit to show it to an administrator and accepts administrator's input, an handling executing unit which carries out processing which is an handling for a failure on the service executor according to a instruction of the administrator dialogue unit, the operations management apparatus may include: a correlation model generation unit which generates a correlation model of the overall operating state of the service executor by taking out performance information for a predetermined period from the performance information storage processing unit, and by repeating, for all elements of performance information, processing of deriving, for time series of values of any two elements of performance information, a transform function for a case where one element is an input and the other an output; a correlation model information storage processing unit which accumulates the correlation model which the correlation model generation unit generated; a model searching unit which predicts a value of another element (output element) by tracing transform functions between each element of the correlation model of the correlation model information storage processing unit in sequence when a value of one element (input element) of performance information is supposed; a resource information storage processing unit which accumulates resource information which is information which describes an attribute such as the maximum value, the minimum value and the unit of an element of the performance information: and a bottleneck analysis unit which instructs the model searching unit to predict a value of another element (output element) by increasing or decreasing the value of one input element designated in advance among elements of the performance information in sequence, and receives a value of another element (output element) predicted by the model searching unit and compares the predicted value with resource information in the resource information storage processing unit, and when the predicted value of the another element (output element) exceeds a limit, generates an analysis result including the output element and the value of the input element as of that moment, and outputs the result to the administrator dialogue unit may be included. In this operations management apparatus, the correlation model generation unit generates correlation models of the overall operating state of the service executor as a transform function between two elements of performance information. When the value of one element (input element) of performance information is supposed, a value of another element (output element) is predicted by the model searching unit by tracing the transform functions in the correlation models in sequence. Bottleneck analysis unit receives a value of the another element (output element) predicted by the model searching unit by increasing and decreasing the value of the one element (input element) in sequence, and when a value of another element (output element) predicted exceeds a limit, generates an analysis result including the output element and the value of the input element as of that moment.

Thus, by generating a correlation model of performance information automatically from detected performance information to perform a bottleneck analysis, this operations management apparatus can analyze a bottleneck in conformity with a situation at the time of operation including situations failed to have been assumed at the time of a test. This operations management apparatus can analyze not only behavior related to specific processing which is assumed in advance but also the whole behavior of the service executor comprehensively.

Furthermore, because the operations management apparatus can extract a bottleneck which has a high possibility to occur in a targeted system in the future based on a correlation between elements of performance information detected by actual practical use, verification of an analysis result does not need to depends on administrator's experience. Also, the correlation model generated includes transform functions that convert between elements of performance information in 1 to 1. Accordingly, this operations management apparatus can derive another element from one element of performance information easily, and even if a system is magnified, can analyze a bottleneck without the amount of processing becoming enormous.

In an operations management apparatus of one aspect of the exemplary embodiment, the correlation model information storage processing unit accumulates a weight that indicates correctness of each of the transform functions in the correlation models newly; the correlation model generation unit newly includes a function to compare series of values of an element generated by the transform function with series of actually detected values of the output element and calculate a weight of the transform function from the difference of the values in addition to processing to derive the transform function at the time of generation of the correlation model; and the model searching unit may newly include a function to calculate or select one value based on the weight when different values are calculated by a plurality of transform functions for one element of performance information.

In this operations management apparatus, a correlation model generation unit generates a weight that indicates correctness of each transform function, and when different values are calculated depending on a plurality of transform functions for one element of performance information, a model searching unit calculates one value based on the weight. As a result, the operations management apparatus can analyze a bottleneck more correctly, because a value of an element can be predicted more correctly using a plurality of routes in all correlation models.

In an operations management apparatus of one aspect of the exemplary embodiment, as an analysis result of the bottleneck analysis unit, the administrator dialogue unit may show a result screen including an output element which is beyond a limit of the performance and an input element at the time when the limit has been exceeded to an administrator.

In this operations management apparatus, administrator dialogue unit shows an output element which is beyond the limit of the performance and the input element as of that moment, as an analysis result of the bottleneck analysis unit. Thus, which element of a system should be reinforced to cope with an assumed future load can be made clear, because the operations management apparatus presents a value of the maximum performance of the system as well as information which part of the system will be a bottleneck at the time of the maximum performance.

In this operations management apparatus, the result screen presented by the administrator dialogue unit may indicate other elements of performance information which are sequenced in order of the rate of utilization as well as the output element which is beyond a limit of the performance.

In this operations management apparatus, the administrator dialogue unit presents other elements of performance information sequenced in order of the rate of utilization as well as the output element which is beyond a limit of the performance. As a result, the operations management apparatus can show to an administrator clearly that attention to which part of a system including the other elements of performance information is required in terms of performance.

In an operations management apparatus of one aspect of the exemplary embodiment, resource information storage processing unit includes a function to accumulate newly total performance information calculated from a plurality of elements of performance information and group information which designates a combination of a plurality of target elements of the calculation; total performance information manager which receives the group information of the resource information storage processing unit, instructs the correlation model generation unit to generate total performance information, and directs model searching unit to update the value of total performance information is newly included; the correlation model generation unit newly includes a function that generates total performance information which takes time series of values calculated by performing a predetermined arithmetic operation to the value of a plurality of elements of performance information detected simultaneously following a direction of the total performance information manager as a value of an element, and adds the total performance information to the performance information to generate a correlation model; the model searching unit may newly include a function that recalculates the value of total performance information following a direction from total performance information manager when a value of an element of performance information is predicted.

In the operations management apparatus, a correlation model generation unit generates a correlation model including total performance information obtained by performing a predetermined arithmetic operation on a plurality of elements of the detected performance information following directions of the total performance information manager, and a model searching unit predicts a value of performance information using the correlation model including the total performance information. As a result, for example, even when a value of one element of performance information is related to the total of the values of a plurality of elements such as in load sharing processing, the operations management apparatus can analyze a bottleneck correctly without increasing the amount of processing, and thus correct analysis can be performed while suppressing the load.

An operations management apparatus of one aspect of the exemplary embodiment may include an analysis setting generation unit newly that receives a bottleneck analysis result from the bottleneck analysis unit and generates an additional setting to monitor and analyze an element of performance information which is expected to be a bottleneck in the failure analysis unit, and corrects analysis setting accumulated in the analysis setting storage processing unit according to the additional setting.

In this operations management apparatus, the analysis setting generation unit generates an additional setting for a failure analysis unit to analyze and monitor an element of performance information which is expected to be a bottleneck.

An operations management apparatus of one aspect of the exemplary embodiment may include a function where the bottleneck analysis unit receives administrator's input from the administrator dialogue unit to correct the setting information.

The operations management apparatus can control this analysis setting by administrator's input. As a result, for a bottleneck found newly by analyzing a system comprehensively, it is possible to watch the element of the bottleneck continually, and consequently more appropriate operations management can be performed.

Thus, since modeling is performed by extracting a correlation of detected performance information appropriately, operations management apparatus can predicts a bottleneck which may occur in an actual operational situation correctly, and can realize a bottleneck analysis in which administrator's burden is low and which does not increase the processing load that is also needed for an analysis in the large-scale environment.

Functions of an operations management apparatus of each of the exemplary embodiment mentioned above may be realized by a computer and a program as well as by hardware. The program is provided being recorded in a computer-readable recording medium such as a magnetic disk and a semiconductor memory, and by being read by a computer at a time of its start and by controlling operation of the computer, the program can make the computer function as the means in each of the exemplary embodiments described above.

(Program)

Further, the software program of the present invention for enabling the functions of the exemplary embodiments described above includes: each processing program executed in a program such as a program that corresponds to the processing units (processing means), functions and the like shown in the various block diagrams of each of the above-described exemplary embodiments and a program that corresponds to the processing procedures, the processing means, the functions and the like shown in the flowcharts and the like; and the whole part or a part of the method (steps), the described processing, and the data described all through the present specification.

Specifically, an operations management program of each exemplary embodiment can cause a computer provided in an operations management apparatus which acquires performance information for each of a plurality of performance items from a plurality of controlled units and manages operation of the controlled unit to realize various functions.

The operations management program allows a computer to realize a method including the steps of: obtaining a correlation model for each element pair of the performance information by deriving, when the performance items or the controlled units are designated as an element of the performance information, a correlation function between a first series of performance information that indicates time series variation about a first element and a second series of the performance information that indicates time series variation about a second element and by generating the correlation model between the first element and the second element based on the correlation function (symbol 123 shown in FIG. 5 and Step S11 shown in FIG. 11, for example); and predicting, by searching for the correlation model for each element between an input element and an output element among elements of the performance information in series, a value of the output element from a value of the input element based on the correlation model searched (symbol 124 shown in FIG. 5 and Step S12 shown in FIG. 11, for example).

The operations management program further allows a computer to realize a method including a step of: generating, based on resource information which specifies a range of a value of an element of the performance information, when a predicted value of the output element predicted by prediction of a value of the output element exceeds the range, a bottleneck analysis result including the output element and the value of the output element (symbol 125 shown in FIG. 5 and Step S13 shown in FIG. 11, for example).

The operations management program may: calculate, in generation of the correlation model, based on an error between a value of a second element predicted from a value of a first element using the correlation function and a value of the second element acquired, a weight of the correlation model between the first element and the second element; and determine, in a prediction of a value of the output element, when different values can be predicted depending on a plurality of the correlation models for the output element, one value of the output element based on the weight.

The operations management program may: in generation of the correlation model, group the elements, calculate the total value of values of elements which are grouped, add a grouped element with the total value to the performance information as a new element, and generate a correlation model from a correlation between one of the new elements and another of the new elements.

The operations management program may generate an additional monitoring setting in which the output element included in the bottleneck analysis result is a monitoring subject of a failure analysis.

Further, the operations management program may include, in generation of the bottleneck analysis result, the elements sequenced in order of the rate of utilization in the bottleneck analysis result.

The operations management program may include, in generating the bottleneck analysis result, the input element and a value of the input element at the time when a value of the output element exceeds the range in the bottleneck analysis result.

Further, the operations management program may: in generation of the correlation model, calculate a first weight of the correlation model of the first element and the second element, a second weight of the correlation model of the first element and a third element and a third weight of the correlation model of the third element and the second element, respectively; and in a prediction of a value of the output element, predict a value of the output element by comparing an aggregated weight of the second weight to the third weight and the first weight.

Further, the program described above may be of any forms such as an object code, a program executed by an interpreter, script data to be supplied to OS, and the like. The program can be implemented as high-standard procedure-type or object-oriented programming language, or as assembly or machine language according to need. In any case, the language may be of a compiler type or an interpreter type. The program incorporated in application software that can be operated in an ordinal personal computer, a portable information terminal, or the like, is also included.

As for a method for supplying the program, it is possible to provide the program from external equipment communicatively coupled to a computer by an electric communication line (wired or radio line) through the electric communication line.

For example, it is possible to provide the program by connecting to a web page of the internet using a browser of a computer and downloading from the web page the program itself or a file which is compressed including the automatic installation function to a recording medium such as a hard disk.

Further, it is also possible by dividing program codes configuring the program into a plurality of files, and downloading each of the files from different web pages.

In other words, a server which allows program files for realizing functional processing of the present invention on a computer to be downloaded to a plurality of users is also included in the scope of the present invention.

According to a program of the present invention, it is possible to achieve the above-described apparatus according to the present invention relatively easily by loading the program from a storage medium such as ROM that stores the control program to a computer (CPU) and having it executed by the computer, or by downloading the program to a computer via a communication unit and having it executed by the computer. When the spirit of the present invention is embodied as software of apparatus, the present invention naturally exists in a storage medium on which the software is stored and used.

There is no question that the program is all the same regardless of the reproduction stages thereof (whether the program is of a primary recorded program or secondarily recorded program). In case where the program is supplied by utilizing a communication line, the present invention is made use of by using the communication line as a transmission medium. Needless to say, the present invention can be specified as an invention of a program. Furthermore, dependent claims regarding the apparatus may be configured such that they correspond to dependent claims of the method and the program.

(Information Recording Medium)

Further, the program may be recorded on an information recording medium. An application program containing the program is stored on an information recording medium, and it is possible for a computer to read out the application program from the information recording medium and install the application program to a hard disk. With this, the program can be provided by being recorded on an information recording medium such as a magnetic recording medium, an optical recording medium, a ROM, or the like. Using such program-recorded information recording medium in a computer realizes to configure a convenient information processor.

As an information recording media for supplying the program, it is possible to use a semiconductor memory such as a ROM, a RAM, a flash memory, or a SRAM and an integrated circuit, an USB memory or a memory card including such, an optical disk, a magneto-optical disk, a magnetic recording medium, or the like. Further, the program may be recorded on a movable medium such as a flexible disk, a CD-ROM, a CD-R, a CD-RW, an FD, a DVD ROM, an HD DVD (HD DVD-R-SL: single layer, an HD DVD-R-DL: double layer, an HD DVD-RW-SL, an HD DVD-RW-DL, an HD DVD-RAM-SL), a DVD+/−R-SL, a DVD+/−R-DL, a DVD+/−RW-SL, a DVD+/−RW-DL, a DVD-RAM, a Blu-Ray Disk (Registered Trademark): a BD-R-SL, a BD-R-DL, a BD-RE-SL, a BD-RE-DL), an MO, a ZIP, a magnetic card, a magnetic tape, an SD card, a memory stick, a nonvolatile memory card, an IC Card, or may be recorded on a storage device such as a hard disk that is built-in on a computer system.

Further, the information recording medium is to include a medium such as a communication line which is used when transmitting the program via the communication line such as a network of the Internet or a telephone circuit or the like that kinetically holds the program for a short time (transmission medium or a carrier wave), and to include a medium that holds the program for a specific length of time, such as a volatile memory provided inside a computer system to be a server or a client of the above-described case.

Furthermore, in a case where an OS operated on a computer or an RTOS or the like on a terminal (for example, a mobile telephone) executes a part of or the whole processing, it is also possible to achieve the same functions and obtain the same effects as those of the exemplary embodiments described above.

Further, it is also possible to distribute a recording medium such as a CD-ROM in which the program is coded and stored to a user; let the user who satisfies a prescribed condition download key information for decoding the codes from a web page via the internet; and execute the coded program by using the key information to have the program installed to a computer. In this case, the structures of the present invention may include each structural element of the program (various means, steps, and data) and a coding means for coding the program (various means, steps, and data).

Furthermore, although the system according to the exemplary embodiments has been described as a client server system above, it may be a system by Peer-to-Peer communication where terminals configure a network and transmit/receive data each other without a server.

In that case, a manager may be a master terminal in a peer-to-peer method.

Also, there is no problem to integrate a system according to the above-described exemplary embodiments and other information processing systems to configure the whole of the systems as a system according to the present invention. This information processing system is to include OS and hardware such as peripheral equipment.

A system in the exemplary embodiment refers to one in which a plurality of apparatuses are assembled logically, and whether the apparatuses of each configuration are in the same chassis or not is not a question. For this reason, the present invention may be applied to a system including a plurality of equipment, and it may also be applied to an apparatus including one device. OS and hardware such as a peripheral device may be included in a system Further, as for the information processor on which the above-described program and the like are loaded, a server is not limited to a personal computer, but various servers, EWS (engineering work station), a medium-sized computer, a mainframe, or the like may be used. In addition to the above examples, an information terminal may be so structured that it can be utilized through a portable information terminal, various mobile terminals, a PDA, a portable telephone, a wearable information terminal, various kinds of (portable, for example) televisions, a DVD recorder, various kinds of audio equipment, a household appliance to which various information communication functions are incorporated, a game machine having a network function, etc. Alternatively, one which is modified as an application displayed on these terminals can also be included in the scope of the present invention.

Further, the above-described program may be a program that achieves a part of the functions described above, or may be a so-called difference file (difference program) which can achieve the above-described functions in combination with a program that has already been stored in the computer system.

Furthermore, the steps shown in the flowcharts of the present specification include not only the processing executed in a time series manner according to the depicted procedures but also the processing that is not necessarily executed in a time series manner but executed in parallel or individually. Regarding the actual implementation, the order of the program procedures (steps) can be altered. Further, depending on needs of an implementation, a specific procedure (step) described in the current specification can be implemented, eliminated, added, or rearranged as a combined procedure (step).

Further, the functions of the program such as each means and each function of the apparatus, and the functions of the procedures of each step may be achieved by dedicated hardware (a dedicated semiconductor circuit, for example), and a part of the whole functions of the program may be processed by the hardware, and the other functions may be processed by software. In a case of using the dedicated hardware, each unit may be formed by an integrated circuit such as an LSI. These units may be formed on a single chip individually, or a part or the entire units may be formed on a single chip. Further, the LSI may be provided with another functional block such as a streaming engine. Furthermore, the method for forming integrated circuit may not necessarily be limited to an LSI, and a dedicated circuit or a general-purpose processor may be employed. Moreover, if there is introduced a technique for achieving circuit integration in place of a LSI due to improvements in the semiconductor technique or other techniques derived therefrom, that techniques can naturally be used to integrate the functional blocks.

Further, "communication" may be radio communication, wired communication, or communication achieved by employing both the radio communication and the wired communication (i.e., communication is achieved by employing the radio communication in a certain section and by employing the wired communication in another section). In addition, "communication" may be achieved by employing the wired communication from a certain device to another device and employing the radio communication from another device to still another device.

Further, "communication" includes a communications net. As a network configuring the communications net, any of hardware structures can be employed, e.g., various circuit nets such as a portable telephone circuit net (including a base station and a switching system), a public telephone circuit net, an IP telephone net, an ISDN circuit net, or a net similar to those, the Internet (i.e., a communication mode using TCP/IP protocol), the Intranet, LAN (including Ethernet (Registered Trademark) and gigabit Ethernet (Registered Trademark)), WAN, an optical fiber communications net, a power-line communications net, various dedicated circuit net capable of handling broadband, etc. Further, the network may employ any kinds of protocols, and it may be a network using TCP/IP protocol, a network using any kinds of communication protocols other than the TCP/IP protocol, a virtual network built in a software-oriented manner, or a network similar to those. Furthermore, the network is not limited only to a wired network but may also be a radio (including a satellite communication, various high-frequency communication means, or the like) network (for example, a network including a single carrier communication system such as a handy phone system or a portable telephone, a spread spectrum communication system such as W-CDMA or a radio LAN conforming to IEEE802.11b, a multicarrier communication system such as IEEE802.11a or Hiper LAN/2) and combinations of those may be used, and a system connected to another network may also be employed. Further, the network may be of any form such as point-to-point, point-to-multipoints, multipoints-to-multipoints, etc.

Further, in a communication structure between an operations management apparatus and controlled units, an interface formed in one of or both sides of them may be of any types such as a parallel interface, a USB interface, IEEE1394, a network such as LAN or WAN, a type similar to those, or any interface that may be developed in the future.

Furthermore, the way to generate correlation model, and to perform model search does not need to be limited only to a substantial device, it is easily understood that the present invention may function as a method thereof. Accordingly, the present invention regarding a method is not limited only to a substantial device but may also be effective as a method thereof. In this case, an operations management apparatus and an operations management system may be included as examples for realizing the method.

Such an operations management system may be used alone or may be used while being mounted to an apparatus, for example, and thus the technical spirit of the present invention is not limited only to such cases but may also include various forms. Therefore, the present invention may be applied to software or hardware, and the forms thereof may change as needed. When the technical spirit of the present invention is embodied as software of an apparatus, the present invention naturally exists on a recording medium on which the software is recorded and is utilized.

Further, a part of the present invention may be achieved by software and the other part thereof may be achieved by hardware, or a part thereof may be stored on a recording medium to be read accordingly and as needed. When the present invention is achieved by software, it may be structured to use hardware and an operating system, or may be achieved separately from those.

It is supposed that the scope of the invention is not limited to the examples of illustration.

Furthermore, various stages are included in each of the above-described exemplary embodiments, and it is possible to extract various inventions therefrom by combining a plurality of structural elements disclosed therein. That is, the present invention includes various combinations of each of the exemplary embodiments as well as combinations of any one of the exemplary embodiments and any one of modifications examples thereof. In such cases, operational effects obvious from each structure disclosed in each of the exemplary embodiments and the modifications examples thereof are to be included in the operational effects of an exemplary embodiment, even if there are no specific depictions of those in the exemplary embodiment. Inversely, all the structures that provide operational effect depicted in the exemplary embodiments are not necessarily the essential structural elements of the substantial feature part of the present invention. Moreover, an exemplary embodiment configured by omitting some structural elements from the entire structural elements disclosed in the exemplary embodiments, and the technical range based upon the structure thereof may also be taken as the invention.

Each of the exemplary embodiments and the modification examples thereof are merely presented as examples out of variety of embodiments of the present invention for helping the present invention to be understood easily. That is, they are just showing examples when putting the present invention into effect, are illustrative, are not intended to limit the scope of the present invention, and various modifications and/or changes can be applied as needed. It is to be understood that the present invention can be embodied in various forms based upon the technical spirit and the main features thereof, and the scope of the technical spirit of the present invention is not to be limited by the exemplary embodiments and the modification examples thereof.

Accordingly, it is to be understood that each of the elements disclosed above is to include all the design changes and the equivalent thereof within the scope of the technical spirit of the present invention.

In an operations management apparatus of related technology, there are following problems.

That is, in Japanese Patent Application Laid-Open No. 2003-131907, when the configuration is changed partially during continuation of practical use, or when biased use of services occurs, a load may concentrate on an element which is different from ones of at the time of a test. It is difficult to assume all of such changes beforehand, and consequently, there is a problem that an unexpected element becomes a bottleneck according to use conditions outside the assumption.

In Japanese Patent Application Laid-Open No. 2006-024017, when a system is magnified or when it cooperates with other systems, a relation between processing and a load becomes very complicated, and consequently an operations management apparatus has to collect the history of all processing which might be related and analyze it in order to predict a load correctly.

For this reason, there is a problem that, for a correct prediction of a load, a load for a data collection and an analysis is large, and thus high knowledge for analyzing that is needed. There is also a problem that a correct bottleneck analysis cannot be performed, because reliability of a load predicted only from specific processing is low.

In Japanese Patent Application Laid-Open No. 2002-268922, an administrator has to verify whether there is a possibility that a value predicted from individual performance information occurs in actual operation of the system, separately, because a performance value of elements configuring a system does not vary completely independently. For this reason, there is a problem that, in order to determine an element to be a bottleneck correctly, much knowledge is required for an administrator, and the work load of the verification by the administrator also becomes large.

In Japanese Patent Application Laid-Open No. 2002-342182, an operations management apparatus just shows a possibility of the causality by quantifying a magnitude of the relation between performance information. Accordingly, there is a problem that an administrator has to verify which actually is the cause like Japanese Patent Application Laid-Open No. 2002-268922.

Also, when a system is magnified and accordingly the number of elements is increased, there is a problem that the load becomes enormous, because, for each one element, processing to perform multi regression analysis with every other elements is needed in order to quantify the magnitude of a relation between performance information.

Also, because it is difficult to calculate a value of another element for a value of a certain one element, there is a problem that an administrator cannot perform an analysis such as which element will be a bottleneck to a load which can occur in the future.

In Japanese Patent Application Laid-Open No. 2006-146668, a correlation coefficient between obtained operation information is a value, and from correlation of values at some point of time (the time of abnormality), the associated cause of the abnormality can be shown. However, there is a problem that an operations management apparatus cannot perform a correct bottleneck analysis, because correlation of future values that do not exist can not be calculated.

In Japanese Patent Application Laid-Open No. 2007-207117, a function of individual performance information is presumed (like Japanese Patent Application Laid-Open No. 2002-268922). Here, in the formula of $y=f(x)$, x is a time and the formula expresses a time change of one y. An operations management apparatus prepares two such formulas, and the relation between the two is determined by a correlation rule given separately. Because the rule is not generated automatically, when not giving a rule between all performance information for each element of a system separately, there is a problem that an operations management apparatus cannot predict a bottleneck analysis correctly.

That is, because a correlation between the CPU utilization rate and the throughput is a correlation only between an element and another element, and as a result, not all the correlations between all elements of a system is clear, there is a problem that it cannot predict to which element a bottleneck of the system most likely occur.

In Published Japanese translation of PCT application No. 2005-524886 bulletin, correlation model is not used, although a conversion of a workload and metrics is performed. Accordingly, there is a problem that an administrator has to input everything of these conversion methods by handwork.

Thus, in an operations management apparatus of the related technology, there is a problem that a bottleneck which may occur in an actual operational situation cannot be predicted correctly, and consequently administrator's burden and a load of analysis processing is increased.

That is, first, it is difficult to assume completely situations that can occur in the future beforehand, and consequently, there is a problem that an unexpected element becomes a bottleneck in use conditions outside the assumption.

Secondly, there is a problem that, for a correct prediction, a load of data collection and analysis is large and high knowledge for analyzing that is needed. Also, there is a problem that reliability of a load predicted only from specific processing is low and thus a correct bottleneck analysis cannot be performed.

Thirdly, there is a problem that much knowledge is required for an administrator in order to determine an element to be a bottleneck correctly, and accordingly the work load of the administrator for the verification becomes large.

Fourthly, when a system is magnified and elements are increased, there is a problem that a load becomes enormous. Further, there is a problem that an analysis such as which element will be a bottleneck for a load which has a possibility to occur in the future cannot be performed, because it is difficult to calculate a value of another element for a value of a certain one element.

According to the present invention, a correlation model generation unit generates correlation models of the overall operating state of a system using transform functions between elements of performance information. Also, a model searching unit predicts a value of another element (output element), when a value of one element (input element) of performance information is supposed, by tracing transform functions in the correlation models in sequence.

An exemplary advantage according to the invention is that an operations management apparatus, an operations management system, a data processing method and an operations management program in which a bottleneck which may occur in an actual operational situation can be predicted correctly by extracting and modeling a correlation between each element of performance information appropriately, administrator's burden is low, and a bottleneck analysis which does not increase the processing load needed for the analysis can be realized even in a large-scale environment can be provided.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. An operation management apparatus comprising:
a generation unit which generates a correlation model including a plurality of correlation functions between pieces of performance information based on series of performance information each indicating time series variation of a piece of the performance information and weights each indicating a prediction error of the respective correlation functions, the pieces of performance information being acquired from one or more devices included in a system, and performs pruning of a route of the correlation model based on the weight.

2. The operations management apparatus according to claim 1 wherein
the generation unit applies a value of one of the series of performance information to the correlation function to obtain a predicted value of another of the series of performance information, and calculates a weight of the correlation function based on a difference between the predicted value and a value of the another of the series of performance information.

3. The operations management apparatus according to claim 1 further comprising:
a searching unit which predicts a second piece of performance information by using a route having the largest weight among a plurality of routes each including one or some of the correlation functions from a first piece of performance information to the second piece of performance information in the correlation model.

4. The operations management apparatus according to claim 1 further comprising:
a total performance information manager which generates groups of one or more pieces of performance information and calculates a total value of the pieces of performance information included in the respective groups,
wherein the generation unit generates the correlation model including correlation functions between the groups.

5. A data processing method comprising:
generating a correlation model including a plurality of correlation functions between pieces of performance information based on series of performance information each indicating time series variation of a piece of the performance information and weights each indicating a prediction error of the respective correlation functions, the pieces of performance information being acquired from one or more devices included in a system; and
performing pruning of a route of the correlation model based on the weight.

6. The data processing method according to claim 5, wherein
the generating a correlation model applies a value of one of the series of performance information to the correlation function to obtain a predicted value of another of the series of performance information, and calculates a weight of the correlation function based on a difference between the predicted value and a value of the another of the series of performance information.

7. The data processing method according to claim 5 further comprising:
predicting a second piece of performance information by using a route having the largest weight among a plurality of routes each including one or some of the correlation functions from a first piece of performance information to the second piece of performance information in the correlation model.

8. The data processing method according to claim 5 further comprising:
   generating groups of one or more pieces of performance information and calculates a total value of the pieces of performance information included in the respective groups,
   wherein the generating a correlation model generates the correlation model including correlation functions between the groups.

9. A non-transitory computer readable storage medium recording thereon a program, the program causing a computer to perform a method comprising:
   generating a correlation model including a plurality of correlation functions between pieces of performance information based on series of performance information each indicating time series variation of a piece of the performance information and weights each indicating a prediction error of the respective correlation functions, the pieces of performance information being acquired from one or more devices included in a system; and
   performing pruning of a route of the correlation model based on the weight.

10. An operation management apparatus comprising:
   generation means for generating a correlation model including a plurality of correlation functions between pieces of performance information based on series of performance information each indicating time series variation of a piece of the performance information and weights each indicating a prediction error of the respective correlation functions, the pieces of performance information being acquired from one or more devices included in a system, and performing pruning of a route of the correlation model based on the weight.

* * * * *